United States Patent
Kouchi et al.

(10) Patent No.: US 7,444,086 B2
(45) Date of Patent: Oct. 28, 2008

(54) IMAGE FORMING APPARATUS INCLUDING A PRINT-REQUEST INFORMATION INPUTTING UNIT AND IMAGE READING UNIT, AND IMAGE FORMING METHOD

(75) Inventors: Miki Kouchi, Kanagawa (JP); Rie Nakamura, Tokyo (JP); Noritada Ohi, Saitama (JP); Hidemasa Morimoto, Kanagawa (JP); Akihiro Kakoi, Kanagawa (JP); Yoshinori Furuichi, Kanagawa (JP); Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 11/304,640

(22) Filed: Dec. 16, 2005

(65) Prior Publication Data

US 2006/0159468 A1   Jul. 20, 2006

(30) Foreign Application Priority Data

Dec. 24, 2004   (JP) .............................. 2004-374671

(51) Int. Cl.
*G03G 15/00* (2006.01)
(52) U.S. Cl. ............................................ 399/13; 399/8
(58) Field of Classification Search .................. 399/12, 399/13, 8, 81, 82
See application file for complete search history.

(56) References Cited

U.S. PATENT DOCUMENTS 6,825,862 B2 * 11/2004 Tokunaga ................... 347/116

2004/0257609 A1 * 12/2004 Tokimatsu ................. 358/1.15

FOREIGN PATENT DOCUMENTS

| JP | 8-139837 | | 5/1996 |
|---|---|---|---|
| JP | 10-274906 | | 10/1998 |
| JP | 11134144 A | * | 5/1999 |
| JP | 2000-43375 | | 2/2000 |
| JP | 2000-47536 | | 2/2000 |
| JP | 2000-206836 | | 7/2000 |
| JP | 2000-228707 | | 8/2000 |
| JP | 2000-276310 | | 10/2000 |
| JP | 2000-335057 | | 12/2000 |
| JP | 2000-347826 | | 12/2000 |
| JP | 2001-13827 | | 1/2001 |
| JP | 2001166636 A | * | 6/2001 |
| JP | 2003-271017 | | 9/2003 |
| JP | 2003-274079 | | 9/2003 |

(Continued)

OTHER PUBLICATIONS

Computer translation JP2005-221691A.*

*Primary Examiner*—Quana M Grainger
(74) *Attorney, Agent, or Firm*—Oblon, Spivak, McClelland, Maier & Neustadt, P.C.

(57) ABSTRACT

An image forming apparatus includes a print-request information inputting unit, an image reading unit, a plurality of image forming units, a plurality of sheet feeding units, a memory unit and a control unit wherein the control unit reading out, when print-request information is inputted, ID information and device information from a memory unit and selects, based on the plural ID information, the device information and the print-request information, an optimum image forming unit that satisfies the print-request information. The control unit further causes the selected image forming unit to execute print processing.

16 Claims, 44 Drawing Sheets

FOREIGN PATENT DOCUMENTS

| | | |
|---|---|---|
| JP | 2003-287984 | 10/2003 |
| JP | 2003-287992 | 10/2003 |
| JP | 2004-12524 | 1/2004 |
| JP | 2004-48511 | 2/2004 |
| JP | 2004-151404 | 5/2004 |
| JP | 2004214801 A * | 7/2004 |
| JP | 2004-223967 | 8/2004 |
| JP | 2004-235769 | 8/2004 |
| JP | 2005010679 A * | 1/2005 |
| JP | 2005110076 A * | 4/2005 |

* cited by examiner

START → POWER ON (S5101) → INITIALIZE (S5102) → DETECT NEW IMG FORMING PART? (S5103)
- NO → END
- YES → CREATE NEW FORMING PART CONTROLLER (S5104) → ALLOCATE ID (S5105) → END

| IMG FORMING PART ID | SUPPORTED COLOR INFO |
|---|---|
| 0×00 | FULL COLOR |
| 0×01 | B&W |
| 0×02 | TWO COLORS |
| ⋮ | ⋮ |

FIG.8

| IMG FORMING PART ID | SUPPORTED COLOR INFO | COLOR ADJ RECORD INFO |
|---|---|---|
| 0 × 00 | FULL COLOR | ADJ AFTER A SHEETS |
| 0 × 01 | FULL COLOR | ADJ AFTER B SHEETS |
| 0 × 02 | FULL COLOR | ADJ AFTER C SHEETS |
| ⋮ | ⋮ | ⋮ |

| IMG FORMING PART ID | SUPPORTED COLOR INFO | TONER INFO |
|---|---|---|
| 0×00 | FULL COLOR | A |
| 0×01 | FULL COLOR | A |
| 0×02 | FULL COLOR | B |
| ⋮ | ⋮ | ⋮ |

| IMG FORMING PART ID | SUPPORTED SHEET |
|---|---|
| 0×01 | PLAIN PAPER, CARD BOAD, OHP |
| 0×00 | PLAIN PAPER, CARD BOAD, OHP, USED PAPER |
| ⋮ | ⋮ |

FIG.14

| SHEET FEED SOURCE | SHEET ID | 0 × 00 | 0 × 01 |
|---|---|---|---|
| a | USED PAPER | OK | NG |
| b | PLAIN PAPER | OK | OK |
| c | PLAIN PAPER | OK | OK |
| d | OHP | OK | OK |
| ⋮ | ⋮ | ⋮ | ⋮ |

FIG.16

| SHEET FEED SOURCE | SHEET ID | 0 × 00 | 0 × 01 |
|---|---|---|---|
| a | USED PAPER | OK | NG |
| b | PLAIN PAPER | OK | OK |
| c | PLAIN PAPER | OK | OK |
| d | OHP | OK | NG |
| ⋮ | ⋮ | ⋮ | ⋮ |

| ID | 0×00 | 0×01 |
|---|---|---|
| 1 COPY | 4.73sec | 5.77sec |
| 2 COPIES | 6.47sec | 7.26sec |
| 3 COPIES | 8.87sec | 8.74sec |
| ⋮ | ⋮ | ⋮ |

PREDETERMINED VALUE

| SIZE CODE | SHEET SIZE |
|---|---|
| s1 | A3 VERTICAL |
| s2 | B4 VERTICAL |
| s3 | A4 HORIZONTAL |
| s4 | A4 VERTICAL |
| s5 | B5 HORIZONTAL |
| s6 | B5 VERTICAL |
| s7 | A5 VERTICAL |

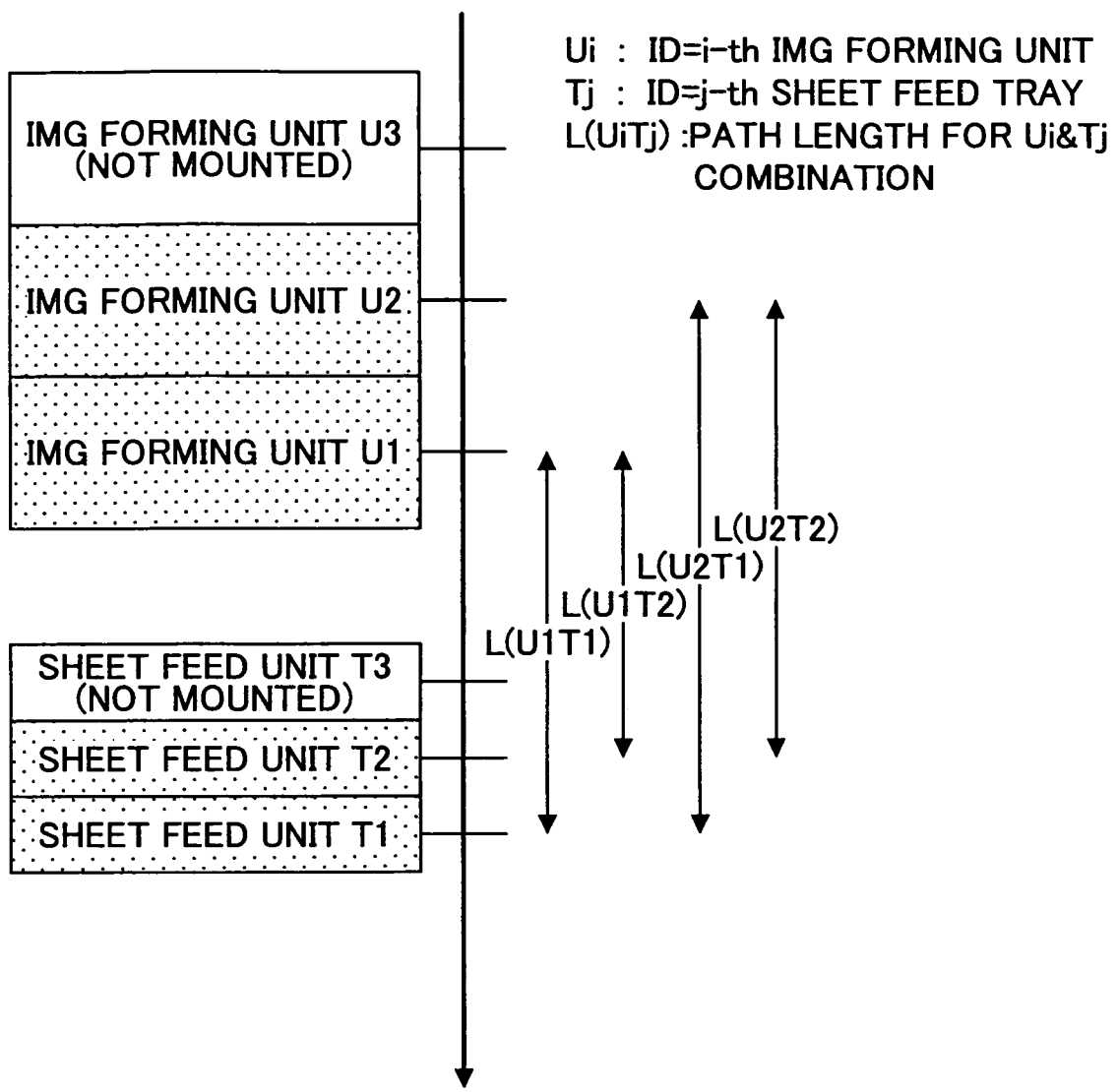

| IMG FORMING UNIT ID | MOUNT/ NOT-MOUNT | INFO |
|---|---|---|
| 1 | MOUNTED | XXX,XXX |
| 2 | NOT MOUNTED | |
| 3 | NOT MOUNTED | |

FIG.28

| IMG FORMING UNIT ID | MOUNT/NOT-MOUNT | SUPPORTED SHEET SIZE |
|---|---|---|
| U1 | MOUNTED | S(U1)={s2,s3,s4,s5,s6,s7} |
| U2 | MOUNTED | S(U2)={s1,s2,s3,s4,s5,s6,s7} |
| U3 | NOT MOUNTED | |

FIG.29

| SHEET FEED TRAY ID | MOUNT/NOT-MOUNT | SUPPORTED SHEET SIZE |
|---|---|---|
| T1 | MOUNTED | S(T1)={s1,s2,s3,s4,s5,s6,s7} |
| T2 | MOUNTED | S(T2)={s1,s2,s3,s4,s5,s6,s7} |
| T3 | NOT MOUNTED | |

FIG.30

| | T1 | T2 | T3 |
|---|---|---|---|
| U1 | S(U1T1)={s2,s3,s4,s5,s6,s7} | S(U1T2)={s2,s3,s4,s5,s6,s7} | |
| U2 | S(U2T1)={s1,s2,s3,s4,s5,s6,s7} | S(U2T2)={s1,s2,s3,s4,s5,s6,s7} | |
| U3 | | | |

FIG.31

| | T1 | T2 | T3 |
|---|---|---|---|
| U1 | L(U1T1)=300 | L(U1T2)=200 | |
| U2 | L(U2T1)=400 | L(U2T2)=300 | |
| U3 | | | |

FIG.33

| IMG FORMING UNIT ID | MOUNT/NOT-MOUNT | SUPPORTED SHEET SIZE | IMG FORMING TIME |
|---|---|---|---|
| U1 | MOUNTED | S(U1)={s2,s3,s4,s5,s6,s7} | R(U1)=30 |
| U2 | MOUNTED | S(U2)={s1,s2,s3,s4,s5,s6,s7} | R(U2)=10 |
| U3 | NOT MOUNTED | | |

FIG.34

| SHEET FEED TRAY ID | MOUNT/NOT-MOUNT | SUPPORTED SHEET SIZE |
|---|---|---|
| T1 | MOUNTED | S(T1)={s1,s2,s3,s4,s5,s6,s7} |
| T2 | MOUNTED | S(T2)={s1,s2,s3,s4,s5,s6,s7} |
| T3 | NOT MOUNTED | |

FIG.35

| | T1 | T2 | T3 |
|---|---|---|---|
| U1 | S(U1T1)={s2,s3,s4,s5,s6,s7} | S(U1T2)={s2,s3,s4,s5,s6,s7} | |
| U2 | S(U2T1)={s1,s2,s3,s4,s5,s6,s7} | S(U2T2)={s1,s2,s3,s4,s5,s6,s7} | |
| U3 | | | |

FIG.36

| | T1 | T2 | T3 |
|---|---|---|---|
| U1 | L(U1T1)=300 | L(U1T2)=200 | |
| U2 | L(U2T1)=400 | L(U2T2)=300 | |
| U3 | | | |

FIG.37

|  | T1 | T2 | T3 |
|---|---|---|---|
| U1 | Q(U1T1)<br>=L(U1T1)/S+R(U1)<br>=300/10+30<br>=60 | Q(U1T2)<br>=L(U1T2)/S+R(U1)<br>=200/10+30<br>=50 | |
| U2 | Q(U2T1)<br>=L(U2T1)/S+R(U2)<br>=400/10+10<br>=50 | Q(U2T2)<br>=L(U2T2)/S+R(U2)<br>=300/10+10<br>=40 | |
| U3 | | | |

FIG.38

| IMG FORMING PART | DUPLEX SUPPORT INFO |
|---|---|
| 0×00 | OK |
| 0×01 | OK |
| 0×02 | NG |
| ⋮ | ⋮ |

FIG.39

| IMG FORMING PART | DUPLEX SUPPORT INFO | SPEED(SHEETS/min) |
|---|---|---|
| 0×00 | OK | 15 |
| 0×01 | OK | 15 |
| 0×02 | NG | 40 |
| ⋮ | ⋮ | ⋮ |

FIG.42

| IMG FORMING PART | IMG FORMING SPEED |
|---|---|
| 0×01 | 40 /min |
|  |  |

FIG.43

| PATH | PATH LENGTH |
|---|---|
| FROM SHEET FEEDER 1 TO IN OF IMG FORMING PART | 300mm |
| FROM SHEET FEEDER 2 TO IN OF IMG FORMING PART | 400mm |
| ⋮ | ⋮ |
| IMG FORMING PART OUT TO DISCHARGE | 100mm |
| ⋮ | ⋮ |

FIG.45

| PATH | PATH LENGTH |
|---|---|
| FROM IMG FORMING PART(9-1) CONN. TO IN OF IMG FORMING PART | 50mm |
| FROM IMG FORMING PART OUT TO IMG FORMING PART(9-1) CONN. | 50mm |

FIG.46

| PATH | PATH LENGTH |
|---|---|
| FROM SHEET FEED 1 TO CONN. OF IMG FORMING PART(9-1) | 100mm |
| FROM SHEET FEED 2 TO CONN. OF IMG FORMING PART(9-1) | 200mm |
| FROM IMG FORMING PART(9-1) TO IMG FORMING PART(9-2) | 150mm |
| ⋮ | ⋮ |
| FROM IMG FORMING PART (9-1) OUT TO DISCHARGE PART | 50mm |
| ⋮ | ⋮ |

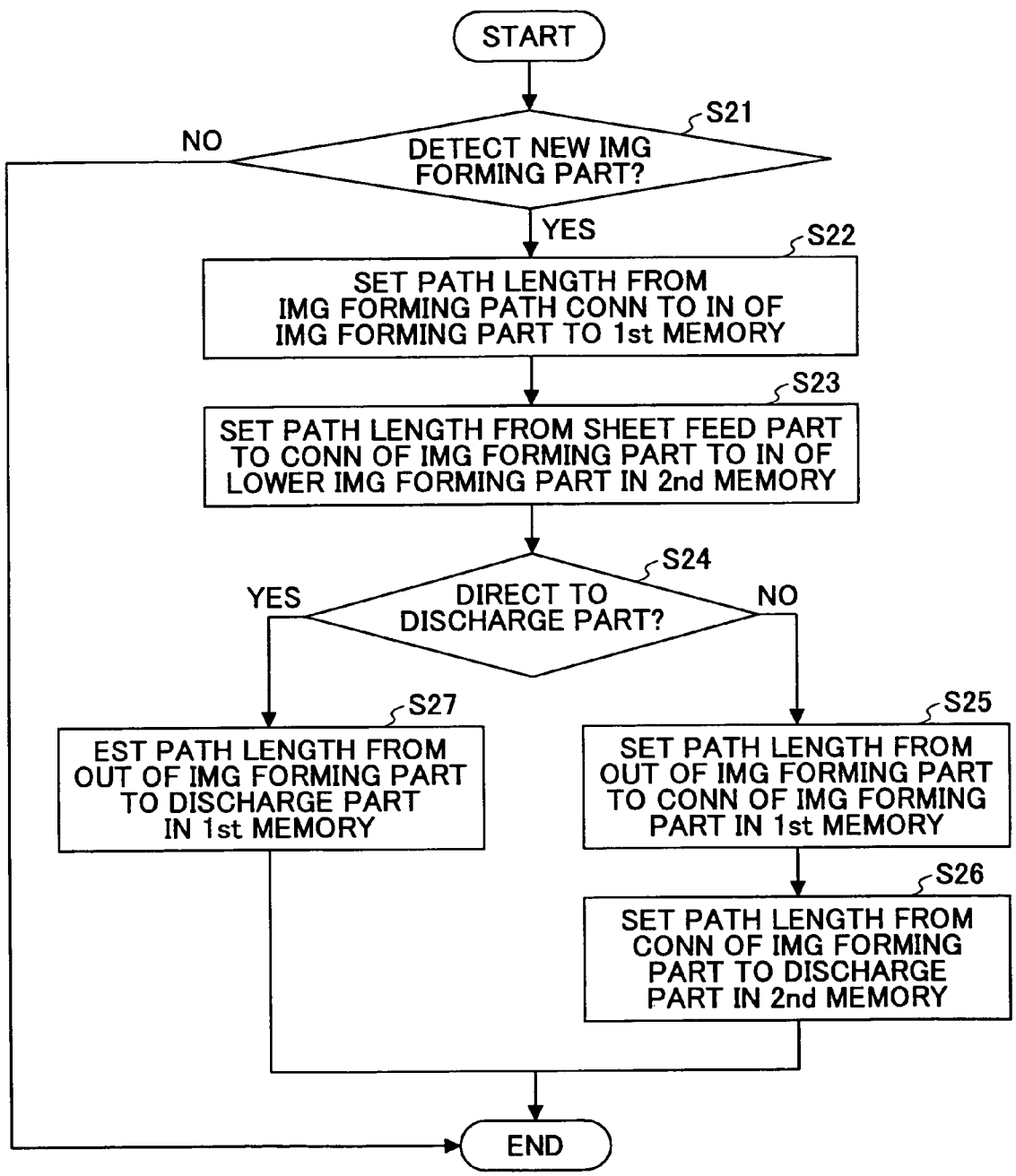

FIG.48

| IMG FORMING PART ID | PATH | PATH LENGTH | IMG FORMING SPEED | IMG FEED SPEED |
|---|---|---|---|---|
| 0×00 | FROM CONN. OF IMG FORMING PART TO IN OF IMG FORMING PART | 50mm | - | 250mm/sec or less |
| 0×00 | FROM OUT OF IMG FORMING PART TO DISCHARGE CONN. | 50mm | - | 250mm/sec or less |
| 0×00 | FROM IMG FORMING PART IN TO OUT | 300mm | 35 /min | 150mm/sec |

| IMG FORMING PART ID | PATH | PATH LENGTH | IMG FORMING SPEED | IMG FEED SPEED |
|---|---|---|---|---|
| 0×01 | FROM IMG FORMING PART(9-1) CONN. TO IN OF IMG FORMING PART | 50mm | - | 250mm/sec or less |
| 0×01 | FROM OUT OF IMG FORMING PART TO CONN. OF IMG FORMING PART(9-1) | 50mm | - | 250mm/sec or less |
| 0×01 | FROM IN OF IMG FORMING PART TO OUT | 300mm | 40 /min | 175mm/sec |

FIG.49

| PATH | PATH LENGTH | SHEET FEED SPEED |
|---|---|---|
| FROM SHEET FEED 1 TO CONN. OF IMG FORMING PART | 100mm | 200mm/sec |
| FROM SHEET FEED 2 TO CONN. OF IMG FORMING PART | 200mm | 200mm/sec |
| FROM IMG FORMING PART(9-1) TO CONN. OF IMG FORMING PART | 150mm | 200mm/sec |
| FROM IMG FORMING PART(9-2) TO CONN. OF IMG FORMING PART | 150mm | 200mm/sec |
| ⋮ | ⋮ | ⋮ |
| FROM IMG FORMING PART OUT TO DISCHARGE PART | 50mm | 200mm/sec |
| ⋮ | ⋮ | ⋮ |

IMAGE FORMING APPARATUS INCLUDING A PRINT-REQUEST INFORMATION INPUTTING UNIT AND IMAGE READING UNIT, AND IMAGE FORMING METHOD

BACKGROUND OF THE INVENTION

The present invention relates to image forming apparatus and image forming method that has the capability of selecting an appropriate image forming part from plural image forming parts.

Recently, there are proposed various approaches for speeding up image formation in image forming apparatuses including a digital copying machine. One such approach is called connected image forming function.

In the connected image forming function, two image forming apparatuses are used for example to share the workload of making 100 copies from a single manuscript. With this, it becomes possible to finish the copying with a time of one-half the time needed when the copy has been made by using a single copying machine.

In relation to the foregoing technology of connected image formation, there is a known technology of copying machine that allows printing, in the case there has occurs a problem in a current copying machine used for printing, by using a different copying machine. Reference should be made to Patent Reference 1. Further, there is proposed a system having plural image forming parts and thus capable of performing parallel processing wherein it is possible to minimize the down time of the system even when there has occurred a problem. Reference should be made to Patent Reference 2.

Patent Reference 1 Japanese Laid-Open Patent Application 2000-335057 official gazette Patent Reference 2 Japanese Laid-Open Patent Application 2003-number 287984 official gazette

SUMMARY OF THE INVENTION

However, with the conventional art of connected image formation function technology as in the case of Patent Reference 1 and Patent Reference 2, there is a need of providing plural image forming apparatuses, and thus, there arise problems of cost and convenience for the operator, such as different destinations for discharging the copies. There are not many users who can provide sufficient place or bear cost for such conventional connected image forming systems.

Thus, it is a general object of the present invention to provide a single image forming apparatus having therein plural image forming parts, a control unit controlling the plural image forming parts and a memory unit memorizing various information and is capable of achieving connected image formation function by suitable selecting an image forming parts by the control unit based on the information memorized in the memory unit, such that the speed of printing is increased while lowering the cost and increasing the convenience of the operator for using the image forming apparatus. Further, the present invention provides an image forming method that uses such an image forming apparatus.

In a first aspect, the present invention provides an image forming apparatus, comprising:

a print-request information inputting unit inputted with print-request information that specifies a predetermined print processing, said print-request information inputting unit further executing said predetermined print processing;

an image reading unit that reads an image of a manuscript;

a plurality of image forming units each forming image data of an image read by said image reading unit as an output thereof;

a plurality of sheet feeding units each holding recording sheets to be recorded with said image data formed by said image forming unit, each of said plurality of sheet feeding units feeding said recording sheet to said image forming apparatus;

a memory unit memorizing ID information, said ID information identifying a specific image forming unit or a specific sheet feeding unit, said memory unit further memorizing device information corresponding to said ID information; and a control unit controlling said print-request information inputting unit, said image reading unit, said plurality of image forming units, said plurality of sheet feeding units, and said memory unit, said control unit reading out, when said print-request information is inputted, said ID information and said device information from said memory unit, said control unit further selecting, based on said plural ID information, said device information and said print-request information, an optimum image forming unit that satisfies said print-request information, said control unit further causing said selected image forming unit to execute said print processing.

In another aspect, there is provided an image forming method for forming an image by using an image forming apparatus, said image forming apparatus comprising: a plurality of image forming units, each of said plurality of image forming units providing image data of a read image as an output; a plurality of sheet feeding units each holding sheets to be recorded with said image data, each of said plurality of sheet feeding units further providing said recording sheet to said image forming unit; and a memory unit memorizing ID information identifying a specific image forming unit or specific sheet feeding unit, said memory unit further memorizing device information corresponding to said ID information, said method comprising the steps of:

selecting, when print-request information identifying and carrying out a specific print processing has been given, an optimum image forming unit that satisfies said print-request information from said plurality of image forming units based on said plural ID information, said device information and said print-request information; and causing said selected image forming unit to execute said print processing.

According to the present invention, it becomes possible to achieve speedup of printing by using a low-cost and convenient image forming apparatus by realizing the function of conventional connected image formation by way of a single image forming apparatus.

BRIEF DESCRIPTION OF THE DRAWINGS

FIG. 8 is a diagram showing an information table according to Operation 2 of the first embodiment of the present invention;

FIG. 14 is a diagram showing an information table according to Operation 2 of the second embodiment of the present invention;

FIG. 16 is a diagram showing an information table according to Operation 3 of the second embodiment of the present invention;

FIG. 21 is a diagram schematically showing the construction of the image forming unit and the sheet feed unit according to the third embodiment of the present invention;

FIG. 28 is a diagram showing an information table according to Operation 2 of the third embodiment of the present invention;

FIG. 29 is a diagram showing an information table according to Operation 2 of the third embodiment of the present invention;

FIG. 30 is a diagram showing an information table according to Operation 2 of the third embodiment of the present invention;

FIG. 31 is a diagram showing an information table according to Operation 2 of the third embodiment of the present invention;

FIG. 33 is a diagram showing an information table according to Operation 3 of the third embodiment of the present invention;

FIG. 34 is a diagram showing an information table according to Operation 3 of the third embodiment of the present invention;

FIG. 35 is a diagram showing an information table according to Operation 3 of the third embodiment of the present invention;

FIG. 36 is a diagram showing an information table according to Operation 3 of the third embodiment of the present invention;

FIG. 37 is a diagram showing an information table according to Operation 3 of the third embodiment of the present invention;

FIG. 38 is a diagram showing an information table according to Operation 1 of a fourth embodiment of the present invention;

FIG. 39 is a diagram showing an information table according to Operation 3 of the fourth embodiment of the present invention;

FIG. 42 is a diagram showing an information table according to Operation 1 of a fifth embodiment of the present invention;

FIG. 43 is a diagram showing an information table according to Operation 2 of the fifth embodiment of the present invention;

FIG. 45 is a diagram showing an information table according to Operation 3 of the fifth embodiment of the present invention;

FIG. 46 is a diagram showing an information table according to Operation 3 of the fifth embodiment of the present invention;

FIG. 47 is a flowchart showing the operation according to Operation 3 of the fifth embodiment of the present invention;

FIG. 48 is a diagram showing an information table according to Operation 4 of the fifth embodiment of the present invention;

FIG. 49 is a diagram showing an information table according to Operation 4 of the fifth embodiment of the present invention;

DETAILED DESCRIPTION OF THE INVENTION

Hereinafter, the image forming apparatus according to an embodiment of the present invention will be explained in detail with reference to the attached drawings, together with image forming method applicable to the foregoing image forming apparatus.

First, terminology used in the various embodiments below will be explained.

In order to achieve exchange of a control signal, a command or a video signal between "image reading apparatus", "image forming part" and "application", it is necessary that information can be transmitted between different apparatuses. The means of realizing this will be represented as issuance of "control signal" or "command".

First Embodiment

Hereinafter, a first embodiment will be explained with reference to the drawings.

Figure 1:
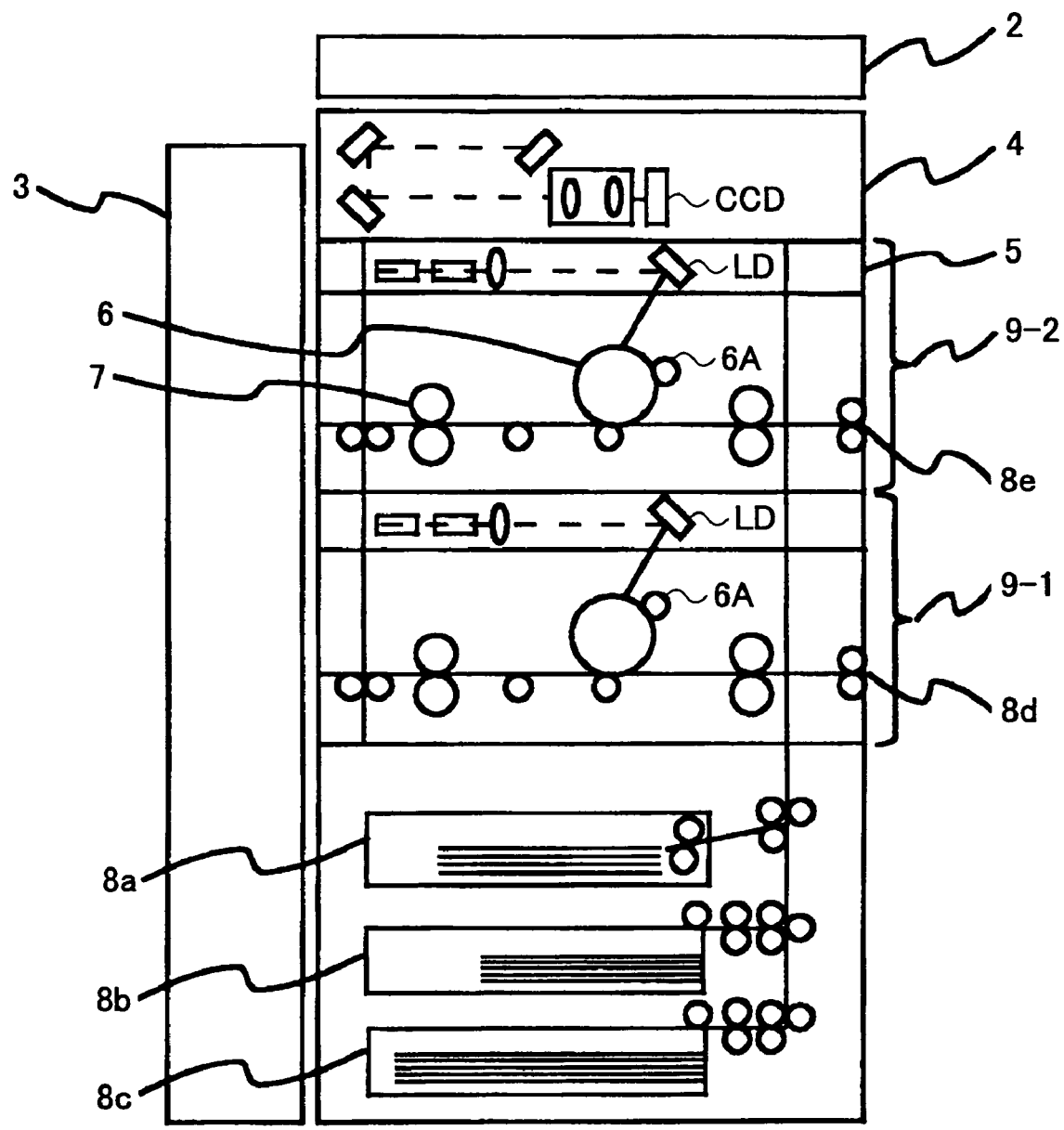
FIG. 1 is a schematic diagram showing the construction of an image forming apparatus according to an embodiment of the present invention in a cross-sectional view.

FIG. 1 shows the construction of the image forming apparatus according to the present invention in a schematic view.

Referring to the drawing, the image forming apparatus of the present embodiment is generally formed of a main body 1, an automatic manuscript feeding device (automatic manuscript feeding unit) 2, and an automatic sorting device (automatic sorting unit) 3, wherein the main body 1 includes an image reading unit (image reading part) 4, an image writing unit (image writing part) 5, a developing unit (developing part) that includes a photosensitive drum 6, a fixing unit (fixing part) 7, and a sheet feed sources (sheet feed part) 8a-8e, and the like. It should be noted that the sheet feed source includes sheet feed cassettes 8a-8c and hand-feed sheet inlets 8d and 8e.

Thus, a manuscript is read in the image reading unit 4 by scanning an optical source over the manuscript and detecting a reflection light by a CCD sensor in the form of an image signal. The image signal thus obtained is applied with image processing and transmitted to the image writing unit 5 in the form of image data.

In the image writing unit 5, there is provided a laser diode LD, wherein the laser diode LD is driven according to image data thus supplied, and an electrostatic latent image is written over a charged rotary drum 6 rotated at a uniform speed by means of the laser beam emitted from the laser diode. Further, the electrostatic latent image thus formed on the rotary drum 6 is developed by a developing unit 6A, and a toner image is formed on the rotary drum 6.

The image thus formed on the photosensitive drum 6 is then transferred to a recording sheet fed from any of the sheet feed units 8a-8c, wherein the toner image thus transferred to the photosensitive drum 6 is fixed upon the recording sheet in a fixing unit 7 that includes a fixing roller and a pressurizing roller. The recording sheet is then forwarded to the automatic sorting unit 3 in a normal sheet discharging mode. The image recording unit 5, the photosensitive drum 6, the fixing unit 7 form together an image forming unit 9. The fixing unit 7 may be excluded from the image forming unit 9.

With the present embodiment, the foregoing image forming unit 9 is mounted in plural numbers in a single image forming apparatus. In the illustrated example of FIG. 1, it can be seen that the image forming apparatus includes two image forming units 9-2 and 9-1, wherein it should be noted that each of the image forming units 9-2 and 9-1 are configured in the form of a detachable unit. Further, with the present embodiment, the image forming units 9-2 and 9-1 are not limited to the image forming unit of the same specification, but it is also possible to mount a black-and-white image forming unit and a color image forming unit.

Figure 2:
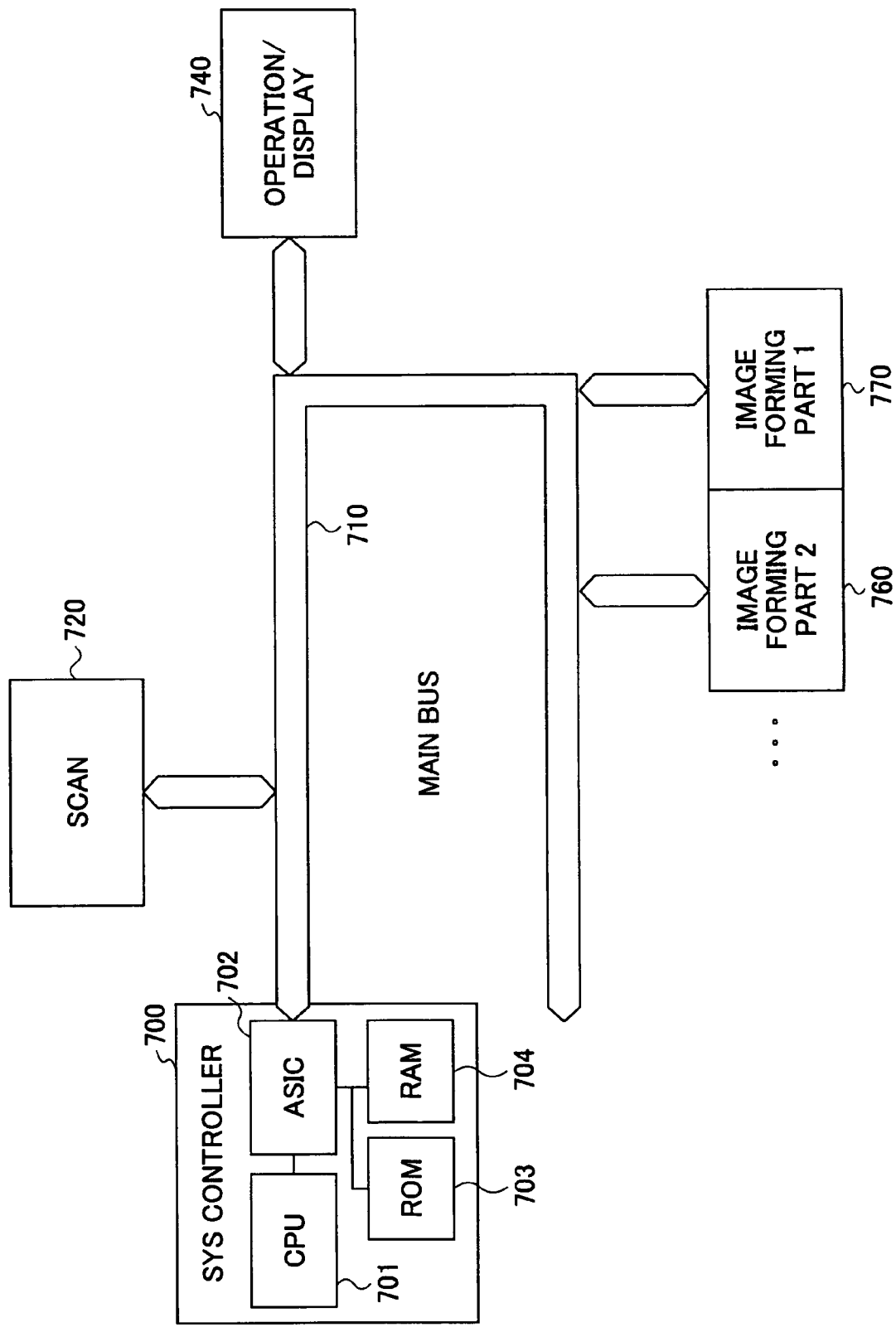
FIG. 2 is a block diagram showing the hardware construction of the image forming apparatus according to an embodiment of the present invention.

FIG. 2 is a block diagram showing the hardware construction according to the present embodiment.

Referring to FIG. 2, there is provided an image reading unit 720 in correspondence to the image reading unit 4 of FIG. 1, wherein the image reading unit 720 causes the optical source to illuminate the manuscript and converts a reflection light formed as a result of the illumination into electric signals by using a solid state imaging device such as a CCD (charge-coupled device). Further, the image reading unit 720 applies necessary image processing. Here, the image processing includes: quantization (converting the analog data formed by a CCD into binary or multivalent data); shading correction (correcting uneven illumination of the manuscript by the optical source or uneven sensitivity of the CCD); MTF correction (correcting blur caused by the optical system); variable power processing (changing the reading density of the image and apply data interpolation by using the read image data).

Further, there is provided an operation/display part 740 that includes therein a liquid crystal touch panel, a ten-key pad, a clear/stop key, a print key, a mode clear key, or the like, wherein the liquid crystal touch panel is used to display various function keys, the number of copies and various messages of the image forming apparatus.

Further, there are provided image forming parts 760 and 770 respectively corresponding to the image forming units 9-2 and 9-1 shown in FIG. 1, wherein the image of the picture transmitted in the form of electric signals is formed on a recording medium such as an ordinary paper, a thermosensitive paper, or the like. While the present invention is to be explained for the case of using a xerographic unit for the image forming unit, the present invention is not limited to such a particular image forming unit and it is possible to use other image forming means such as thermosensitive image forming unit or ink-jet image forming unit.

Further, there is provided a system control unit 700, wherein the system control unit 700 includes: a CPU 701 that performs the functions of setting an image memory controller (included in an ASIC 702), writing and reading of data to and from an image memory via the memory controller, control of the image reading part and the image forming part, and the like; a ROM 703 and a RAM 704 storing program or data of the CPU 701 (ROM 703 and RAM 704 may also be provided separately to an image memory); an I/O port (included in the ASIC 702) used by the CPU 701 when exchange information with peripheral devices; a main bus 710 functioning as the connection means with blade devices, and the like.

"System control part" is defined as the controllers used, when image formation is made by the image forming parts 760 and 770 in the copy mode of the image forming apparatus, to monitor sheet feeding, detect anomaly in the xerographic processing, monitor the state of the sheet feed cassette, and control the scanner for reading images with the image reading part, ON/OFF control of the optical source, and the like.

Meanwhile, with recent digital plain paper copiers, there is a tendency that the image forming apparatus is loaded with plural extension functions instead of single extension function. Thus, there are cases in which plural digital PPCs share a resource and constitute a system. In such cases, the controller controlling the system is designated as "system controller".

With the present embodiment, control of the image reading part 720, the operation and display part 740, the image forming parts 760 and 770, the memory unit inside the system controller 700, and the like, is achieved solely by the CPU 701 in the system controller 700.

Figure 3:
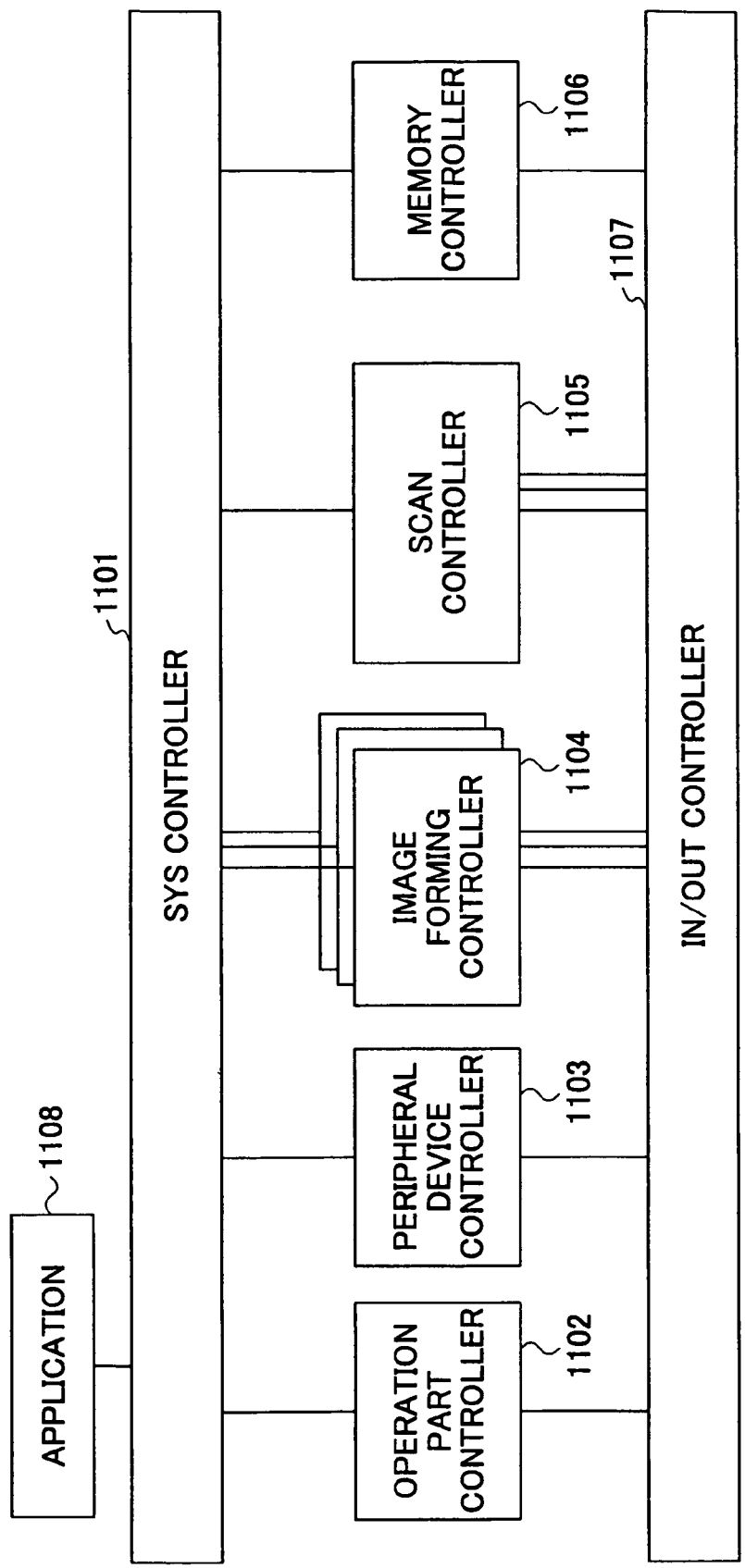
FIG. 3 is a block diagram showing the software construction of the image forming apparatus according to an embodiment of the present invention.

FIG. 3 is a block diagram showing the software construction according to the present embodiment.

Referring to FIG. 3, there is provided an application 1108, which collectively designates various applications implemented in the image forming apparatus such as copying application that executes a copying sequence at the time of the copying operation. Thus, the application 1108 indicates the layer for executing image formation or other operation such as copying application.

Further, there are provided an input/output control part 1107, an operational part controller 1102 and a peripheral device controller 1103, wherein the input/output control part 1107 represents the layer of device drivers that apply logic/physic conversion to data, the operation part controller 1102 is the layer of executing MMI (man-machine interface) such as control of LCD display, LED On and Off, key input scan in the logic level, while the peripheral device controller 1103 represents the layer of executing the control of peripheral devices mounted on the image forming apparatus such as automatic duplex unit, sorter, ADF, and the like, in the logic level.

Further, there are provided plural image forming part controllers 1104, an image reading part controller 1105 and a memory part controller 1106, wherein the image forming part controllers 1104 represent the layer of executing the control of the image forming units 9-2 and 9-1 in the logic level, the image reading part controller 1105 represents the layer of controlling the image reading unit 4 in the logic level, while the memory part controller 1106 represents the control of the memory unit in the system controller 700 in the logic level.

Here, it should be noted that the operational part controller 1102, the peripheral device controller 1103, the image forming part controllers 1104, the image reading part controller 1105 and the memory part controller 1106 are treated as a resource of the image forming apparatus.

The system control part 1101 controls the recourse of the system in response to the request from the application 1108 and executes the operation.

Thus, the system controller 1101 arbitrates the requests from the application 1108 as to the right of using the resource and notifies the result of the arbitration to the application 1108, whether or not the application is allowed to use the resource.

In the case of the image forming apparatus is used in the stand-alone state and not connected to a network, the application can use the entire resource of the system and the copying operation is conducted immediately.

Figure 4:
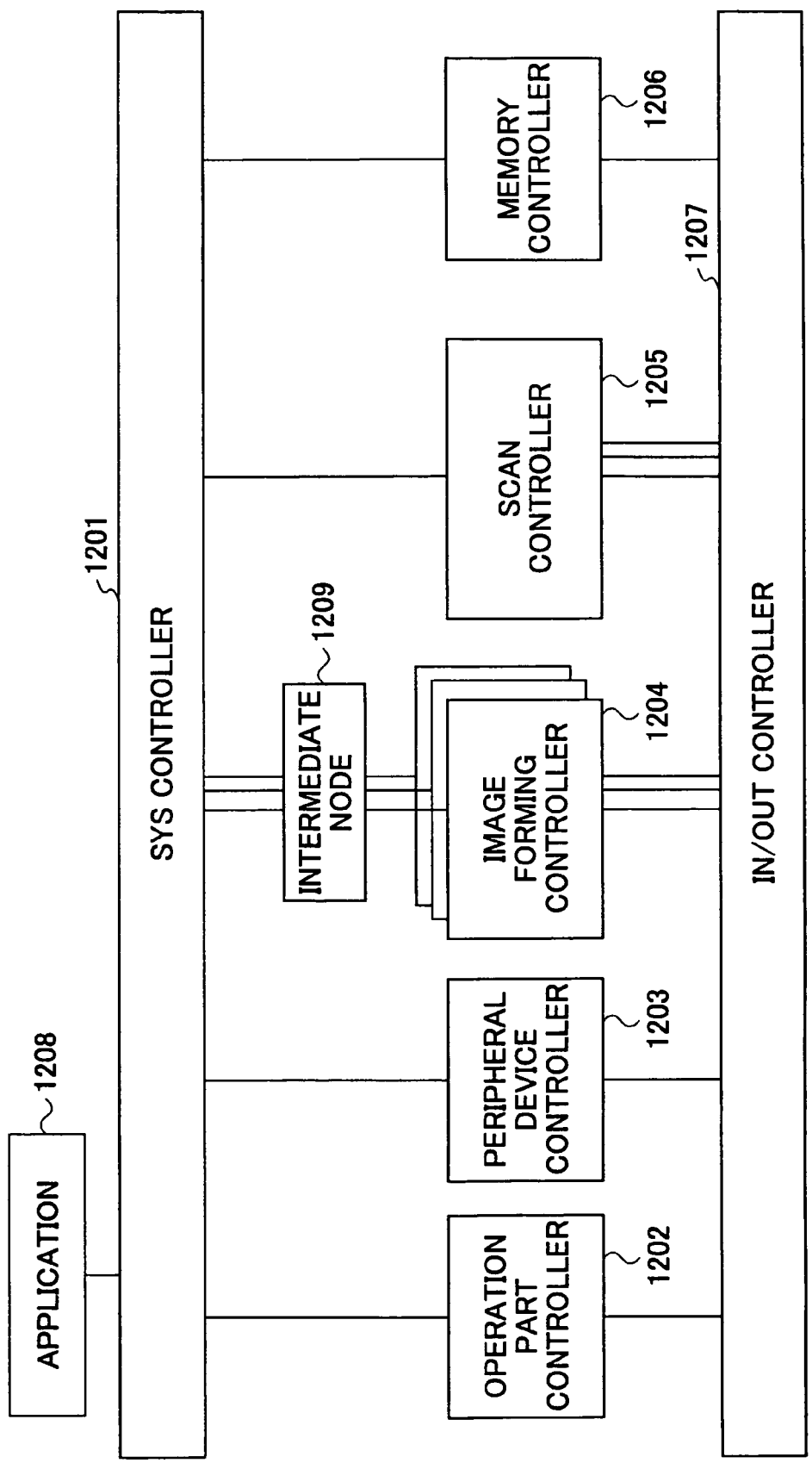
FIG. 4 is a block diagram showing the software construction of the image forming apparatus according to an embodiment of the present invention.

FIG. 4 shows the software construction similar to the one shown in FIG. 3, wherein it will be noted that there is provided an intermediate node 1209 between a system controller 1201 and plural image forming part controllers 1204. It should be noted that the present embodiment is applicable also to the construction shown in FIG. 4.

[Operation 1]

Figures 5, 6:
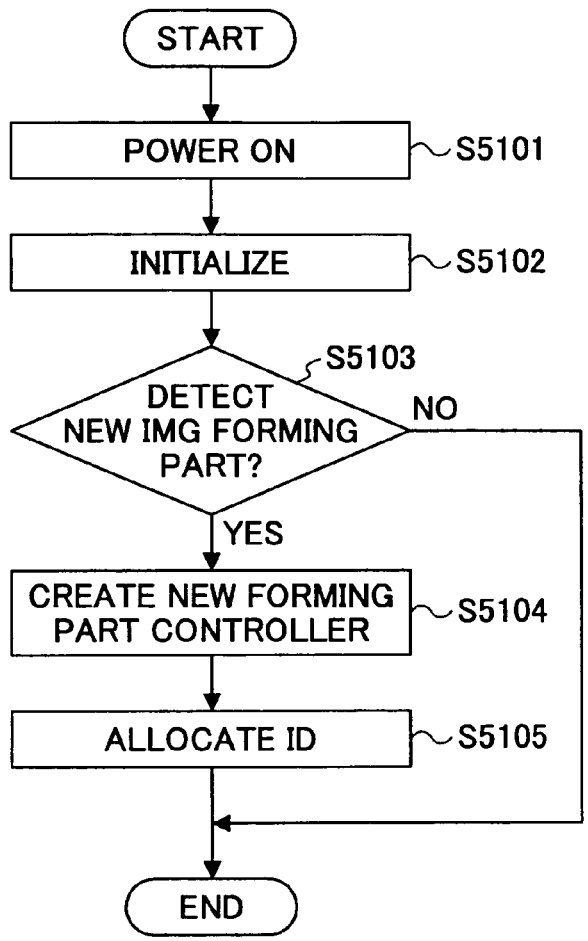
FIG. 5 is a flowchart showing the operation according to Operation 1 of a first embodiment of the present invention.
FIG. 6 is a diagram showing an information table according to Operation 1 of the first embodiment of the present invention.

FIG. 5 is a flowchart showing Operation 1 of the present embodiment while FIG. 6 shows the information memorized in the memory unit.

Referring to FIG. 5, the system controller 1101 executes, in response to power On in a step S5101, initialization of the system in a step S5102, and searches for a new image forming part in a step S5103.

When the result of the step S5103 is YES and a new image forming part is detected, the system controller 1101 creates a new image forming part controller 1104 in a step S5104. When the result of the step S5103 is NO and no new image forming part has been detected, the processing of FIG. 5 is terminated.

Further, in a step S5105, an image forming part IDs, such as 0x00, 0x01, 00x2, and the like, are allocated to the image forming part controller newly discovered in the step S5103 as shown in FIG. 6 so that the system controller 1101 can discriminate the newly discovered image forming part controller.

It should be noted that each image forming part controller 1104 memorizes the color support information of each image forming part (designated by the numerals 9-1 and 9-2 in FIG. 1) in the memory unit based on the information acquired from the image forming parts 760 and 770. Reference should be made to FIG. 6.

In the present embodiment, the memory unit may be provided to any of the system controller 1101, the memory controller 1106, the image forming part controller 1104, and the like.

[Operation 2]

Figure 7:
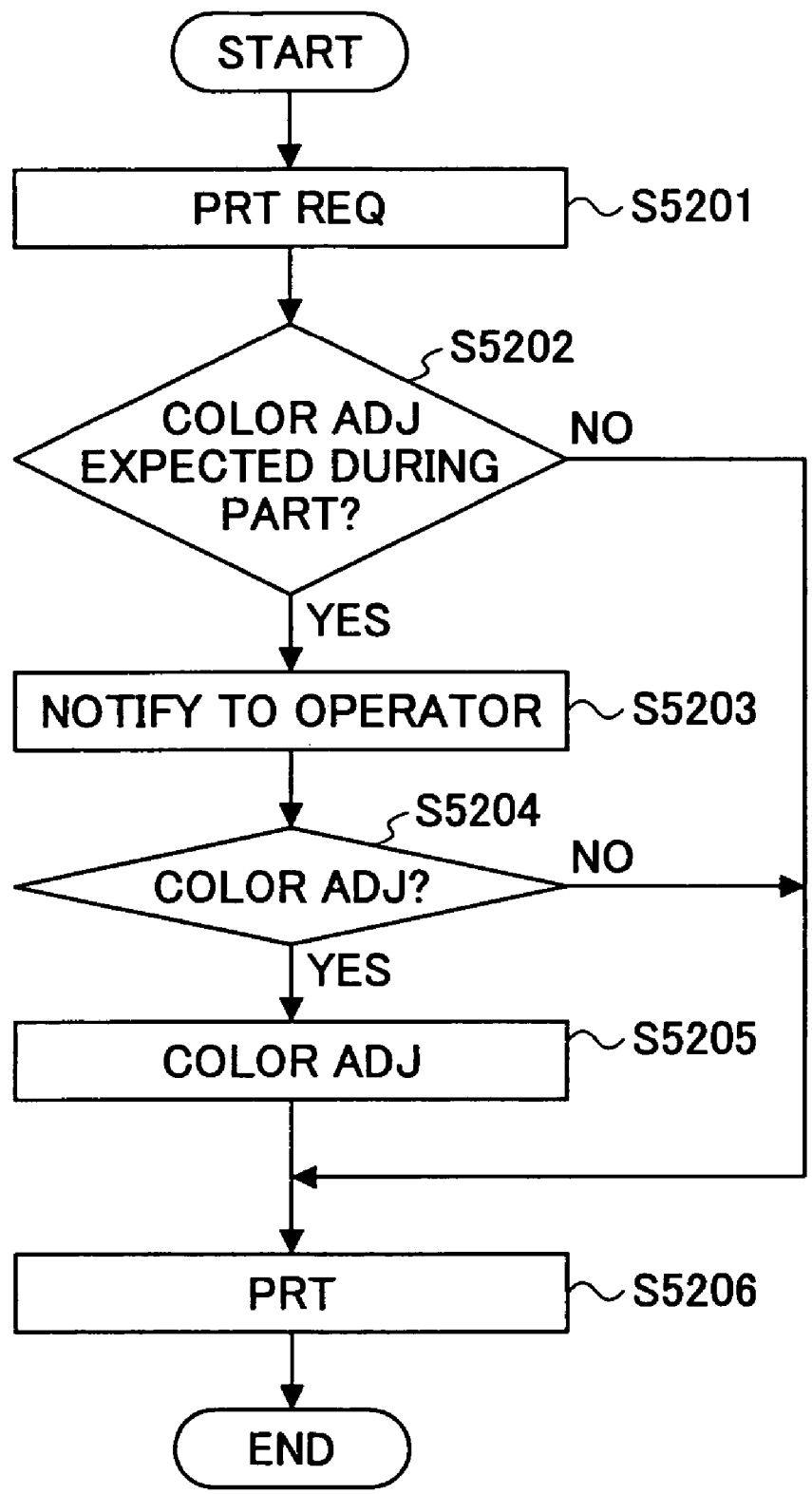
FIG. 7 is a flowchart showing the operation according to Operation 2 of the first embodiment of the present invention.

FIG. 7 is a flowchart showing Operation 2 of the present embodiment, while FIG. 8 shows the information table memorized in the memory unit. As shown in FIG. 8, the present example holds the color adjustment record information in addition to the color support information.

Referring to FIG. 7, the system controller 1101 judges, when a print request has been provided from an operator in a step S5201, as to whether or not it will become necessary to carry out color adjustment during the execution of the job.

When the result of the step S5202 is NO and it was judged that there should be no need of color adjustment, the process proceeds straight to a step S5206 for print processing, while when it was judged that there will be needed color adjustment (YES in the step S5202) for example because of too many pages in the document to be copied, the system controller 1101 notifies this to the operator in a step S5203 and asks for the decision of the operator whether or not to carry out the color adjustment in a step S5204.

Thus, when the operator has judged that color adjustment is necessary (YES in a step S5204), the system controller 1101 executes the color adjustment in a step S5205 based on the color adjustment record information for each of the image forming parts as shown in FIG. 8. The printing operation is conducted thereafter in a step S5206.

When the operator has decided that there is no need of color adjustment (NO in the step S5204), the process moves forward straight to the printing operation in the step 5206.

[Operation 3]

Figure 9:
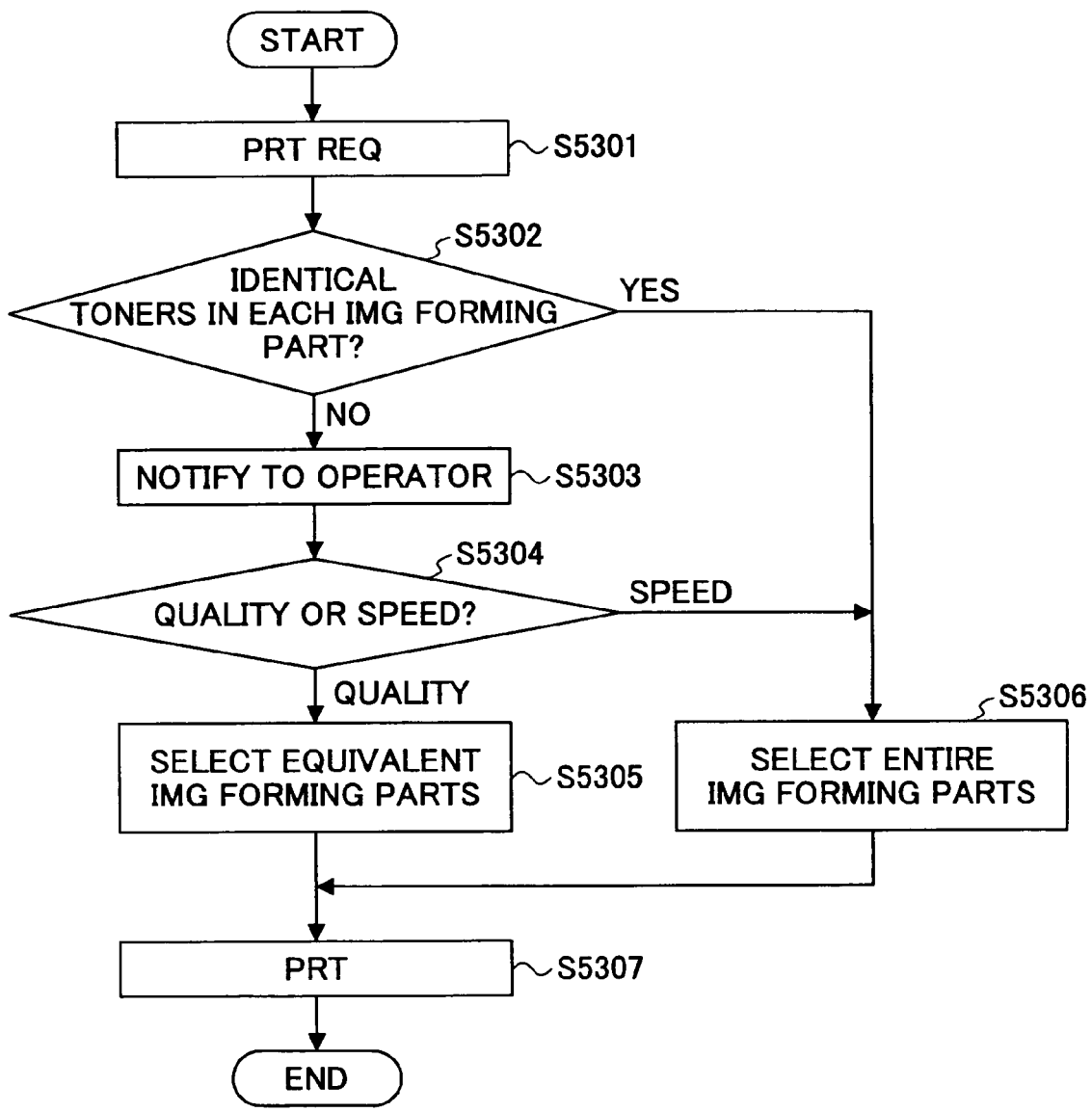
FIG. 9 is a flowchart showing the operation according to Operation 3 of the first embodiment of the present invention.
Figures 10, 11:
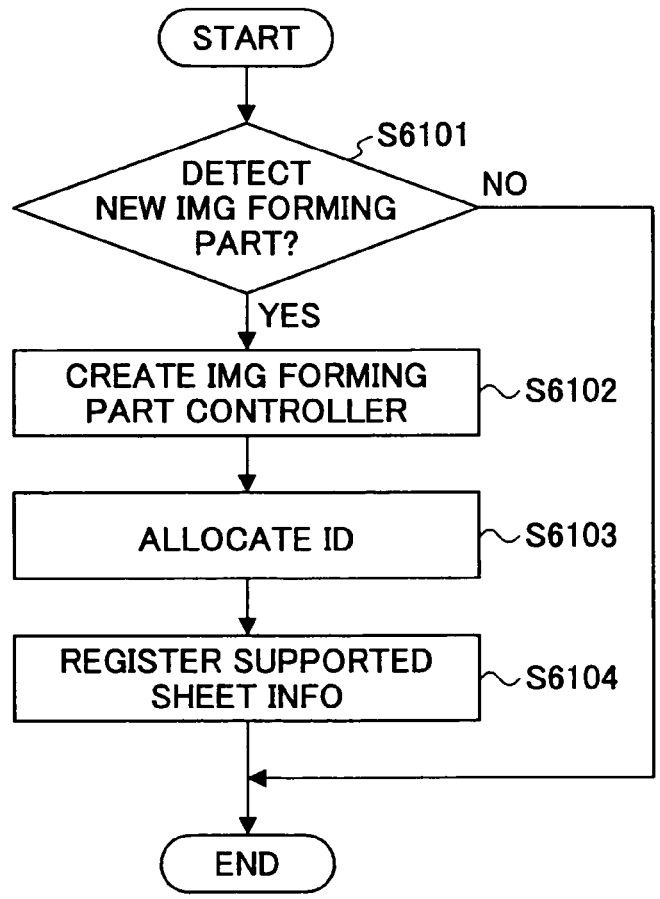
FIG. 10 is a diagram showing an information table according to Operation 3 of the first embodiment of the present invention.
FIG. 11 is a flowchart showing the operation according to Operation 1 of a second embodiment of the present invention.

FIG. 9 is a flowchart showing Operation 3 of the present embodiment, while FIG. 10 shows the information table memorized in the memory unit. As shown in FIG. 10, the present example holds the color toner information in addition to the color support information.

Referring to FIG. 9, the system controller 1101 judges, when a print request has been provided from an operator in a step S5301, as to whether or not the toners of the equivalent kind are loaded in the respective image forming parts in a step S5302 based on the toner information shown in FIG. 10 and makes sure that equivalent image quality is achieved by any of the image forming parts when the print job is executed.

When the result of the step S5302 is YES and it was confirmed that all of the image forming parts are loaded with the respective toners of the equivalent type, all the image forming parts are selected in a step S5306 and the print operation is executed in a step S5307.

On the other hand, when the toners in the image forming parts are not of the equivalent type and the result of the step S5302 is NO, the system controller 1101 notifies this to the operator in a step S5303 and asks for a decision of the operator in a step S5304 as to whether to give priority to the picture quality or to the printing speed.

When priority is given to the speed in the step S5304, the entire image forming parts are selected in a step S5306 and printing is executed in a step S5307. With this case, there may be variation in the print quality of the document.

When the priority is given to the print quality in the step S5304, only those image forming parts that provides the equivalent print quality are selected in a step S5305 based on the toner information shown in FIG. 10 and the printing is carried out in the step 5307 by using only those selected image forming parts. With this process, there occurs some degradation in the printing speed because of exclusion of some image forming parts while such a process can guarantee the printing with the same printing quality while using different image forming parts.

Thus, according to Operation 1 of the present embodiment, it becomes possible to achieve unified management of the color support information of the respective image forming parts, and thus, it becomes possible for the system controller to select, when a print request has been given by the operator, the appropriate image forming parts supporting the colors efficiently, without sending inquiries to the respective image forming parts individually.

According to Operation 2 of the present embodiment, it becomes possible to achieve unified management of the color adjustment record information of the respective image forming parts, and thus, it becomes possible for the system controller to select, when a print request has been given by the operator, the appropriate image forming parts in which color adjustment is expected shortly, without sending inquiries to the respective image forming parts individually.

According to Operation 3 of the present embodiment, it becomes possible to achieve unified management of the cartridge information of the respective image forming parts, and thus, it becomes possible for the system controller to select, when a print request has been given by the operator, the appropriate image forming parts loaded with equivalent toner cartridges, without sending inquiries to the respective image forming parts individually.

Second Embodiment

In a second embodiment of the present invention, an image forming apparatus having the construction identical to that of the first embodiment explained with reference to FIG. 1 is used. Further, the construction of software and hardware are also identical to those of the first embodiment explained with reference to FIGS. 2 and 3.

[Operation 1]

Figures 12, 13:
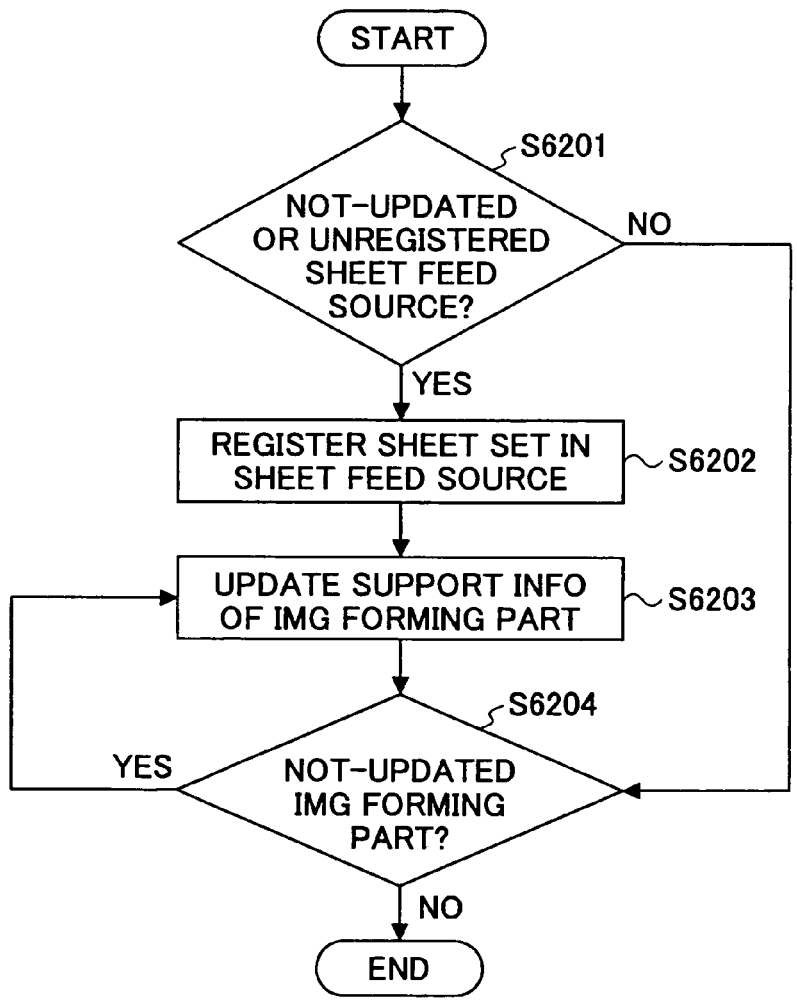
FIG. 12 is a diagram showing an information table according to Operation 1 of the second embodiment of the present invention.
FIG. 13 is a flowchart showing the operation according to Operation 2 of the second embodiment of the present invention.

FIG. 11 is a flowchart showing Operation 1 according to the present embodiment, while FIG. 12 shows an information table memorized in the memory unit.

In the present example, the supported recording sheet information is held for each of the image forming parts as represented in FIG. 12.

Referring to FIG. 11, the system controller 1101 searches, when the image forming apparatus is turned on, for a new image forming part in a step S6101. When the result of the step S6101 is NO and no new image forming part has been detected, the processing of FIG. 11 is terminated.

When the result of the step S6101 is YES and a new image forming part controller is detected, the system controller 1101 creates a new image forming part controller 1104 in a step S6102.

Further, in a step S6103, an image forming part ID is allocated to the image forming part controller thus newly discovered as shown in FIG. 12 so that the system controller 1101 can discriminate the newly discovered image forming part controller.

Further, in a step S6104, each image forming part controller 1104 memorizes the recording sheet support information of each image forming part (designated by the numerals 9-1 and 9-2 in FIG. 1) in the memory unit based on the information acquired from the image forming parts 760 and 770. Reference should be made to FIG. 12. In the present embodiment, the memory unit may be provided to any of the system controller 1101, the memory controller 1106, the image forming part controller 1104, and the like.

[Operation 2]

FIG. 13 is a flowchart showing Operation 2 according to the present embodiment, while FIG. 14 shows an information table memorized in the memory unit.

Referring to FIG. 13, the system controller 1101 searches, when the image forming apparatus is turned on or when the setting of the sheet feed source is modified, for an un-updated or unregistered sheet feed source in a step S6201.

When the result of the step S6201 is NO and no un-updated or unregistered sheet feed source has been detected, the processing proceeds to a step S6204 in search of whether or not there exists an un-updated image forming part.

When the result of the step S6201 is YES and an un-updated or unregistered sheet feed source is detected, the system controller 1101 registers the type of the recording sheet such as whether it is a used paper for using blank side, an ordinary plain paper, an OHP sheet, or the like, held in the sheet feed source in the memory unit in a step 6202 as represented in FIG. 14.

Further, in a step S6203, the support information corresponding to the sheet feed source is updated for each of the image forming parts after completion of the registration and updating of the sheet feed source.

The foregoing updating is conducted for all the image forming parts (YES in step 6204), and when there is no un-updated image forming part (NO in step 6204), the processing is terminated.

With this, it becomes possible for the system controller to recognize the type of the recording sheet and whether it is possible or not to feed the recording sheet through the image forming part easily at the time of the copying work even in the case the sheet feed source is the one that can easily change the recording sheet as in the case of the hand-feed sheet inlet 8*d* of FIG. 1.

[Operation 3]

Figure 15:
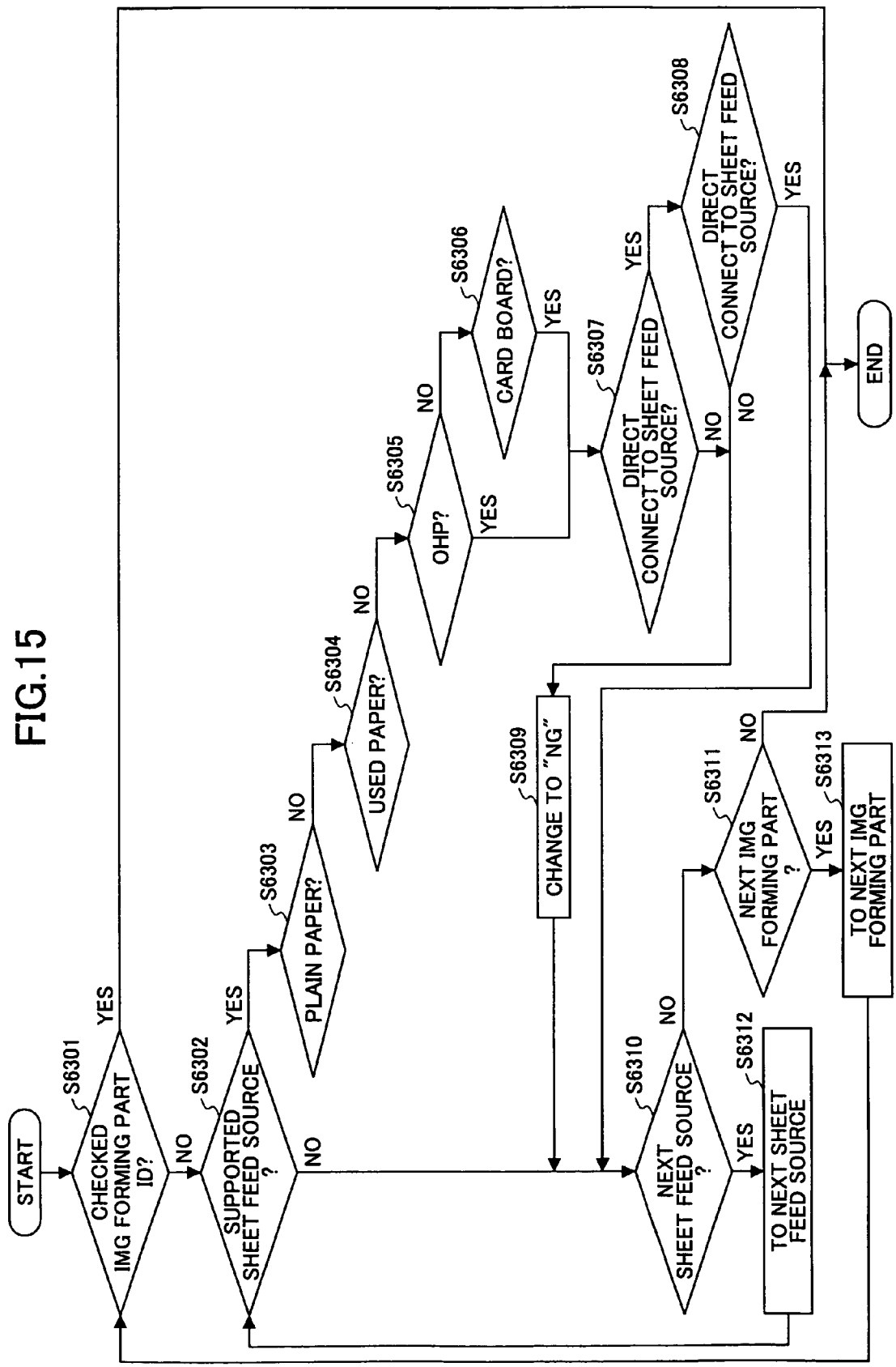
FIG. 15 is a flowchart showing the operation according to Operation 3 of the second embodiment of the present invention.

FIG. 15 is a flowchart showing Operation 3 according to the present embodiment, while FIG. 16 shows an information table memorized in the memory unit. It should be noted that the processing of the flowchart of FIG. 15 is conducted subsequently to the processing of FIG. 13.

The present operation takes into consideration the situation in which some recording sheet cannot pass through the image forming part depending on the location where it is placed as a blade, in spite of the fact that the image forming part itself supports the sheet.

Thus, with the instant operation, possibility or impossibility of sheet feed through is examined after updating of the support information for the entire image forming parts in the memory unit (the state of FIG. 14), only for those sheet feed sources that are supported by the image forming part.

According to the present example, therefore, support is negated for an OHP sheet in the case the image forming part itself supports recording on an OHP sheet but the image forming apparatus is not mounted with a hand-feed tray, provided that the OHP sheet can be fed only from a hand-feed sheet inlet.

Referring to FIG. 15, examination is made first in a step S6301 with regard to the image forming part ID whether or not it has been already checked. When it is already checked (YES in step S6301), the processing is terminated.

When the result of the step 6301 is NO and the image forming ID is the one not checked yet, examination is made in a step S6302 whether or not the sheet feed source is a supported sheet feed source.

When it is a sheet feed source not supported by the image forming part (NO in step S6302), examination is made in a step S6310 whether or not there exists other sheet feed source.

When there is other sheet feed source (YES in step S6310), the target of examination is changed to the next sheet feed unit (step S6312), and judgment is made whether or not it is a supported sheet feed source in the step S6302.

When it is judged in the step S6302 that the sheet feed source is a supported sheet feed source (YES in step S6302), examination is made with regard to the type of the recording sheet as to whether it is a plain paper (step S6303), a used paper (step s6304), a OHP sheet (step S6305), or a cardboard (step S6306). When the sheet is an OHP sheet (YES in step S6305) or a used paper (YES in step S6306), it is judged in a step (S6307) as to whether the image forming part is connected to the sheet feed source directly or not.

When the sheet feed source is coupled directly to the image forming unit (YES in step S6307), examination is made as to whether it is connected to the sheet feed source in a step S6308, and a step S6310 is conducted thereafter as to whether or not there exists a next sheet feed source.

When the image forming source is not connected to the sheet feed source directly (NO in the step S6307), or in the case the image forming unit is connected to the sheet feed source but not connected to a sheet discharging unit (NO in a step S6308), such a construction is not supported and the support information memorized in the memory unit is corrected in a step S6309.

Thus, in this case, the support information "OK" for the sheet feed unit 8*d* having the ID of 0x00 shown in FIG. 14 is changed to "NG" as shown in FIG. 16 as a result of the correction.

Thereafter, detection of the next sheet feed source is conducted in a step S6310.

When it turned out that there is no other sheet feed source in the step S6310 (NO in step S6310), examination is made in a step S6311 as to whether or not there exists other image forming part.

When there is no other image forming part (NO in step S6311), the processing is terminated, while when there exits another image forming part (YES in the step S6311), this another image forming part is chosen as the target of examination in a step S6313, and it is decided whether or not the image forming ID of this image forming part is already checked in the step S6301.

Thus, when an OHP sheet is set in the hand-feed inlet 8*d* with the present example, the ID 0x00 of the image forming part 9-2 of FIG. 1 indicates that OHP sheet is supported (YES in step S6305). Further, it is indicated that the image forming part is connected directly to the hand-feet inlet 8*d* (YES in step S6307). Therefore, it is possible to feed the OHP sheet straight without bending, and it is indicated that image formation and discharging can be conducted without problem (YES in step S6308). Therefore, the sheet feed unit 8*d* is still OK after the examination as to whether or not it is possible to feed through of the sheet, as represented by "OK" in the support information of the image forming unit having the ID of 0x00.

Now consider the image forming unit 9-1 of FIG. 1 having the ID of 0x00. The examination is conducted as to whether it is possible to feed through is conducted as follows. The examination starts from the state of FIG. 14 corresponding to the end of Operation 2, similarly as before.

As a result of the examination with regard to the sheet feed units a-c conducted according to the flowchart of FIG. 15, it is indicated that feeding of the sheet is OK. However, in the case an OHP sheet is set in the hand-feed inlet 8*d*, it is indicated that the sheet is an OHP sheet (YES in step S6305) and that the image forming part is not directly connected to the hand-feed inlet 8*d* (NO in step S6307). Thus, it is decided that such an operation is not supported (step S6309) as shown in ID 0x01 of FIG. 16.

For example, in the case the hand-feed inlet 8*e* is connected directly to the image forming part 9-1 of FIG. 1 having the ID of 0x01(YES in step S6307), the feed path of the sheet to the discharge tray is not straight (NO in step S6308), and thus, it is decided in step S6309 that such an operation or construction is not supported.

[Operation 4]

Figure 17:
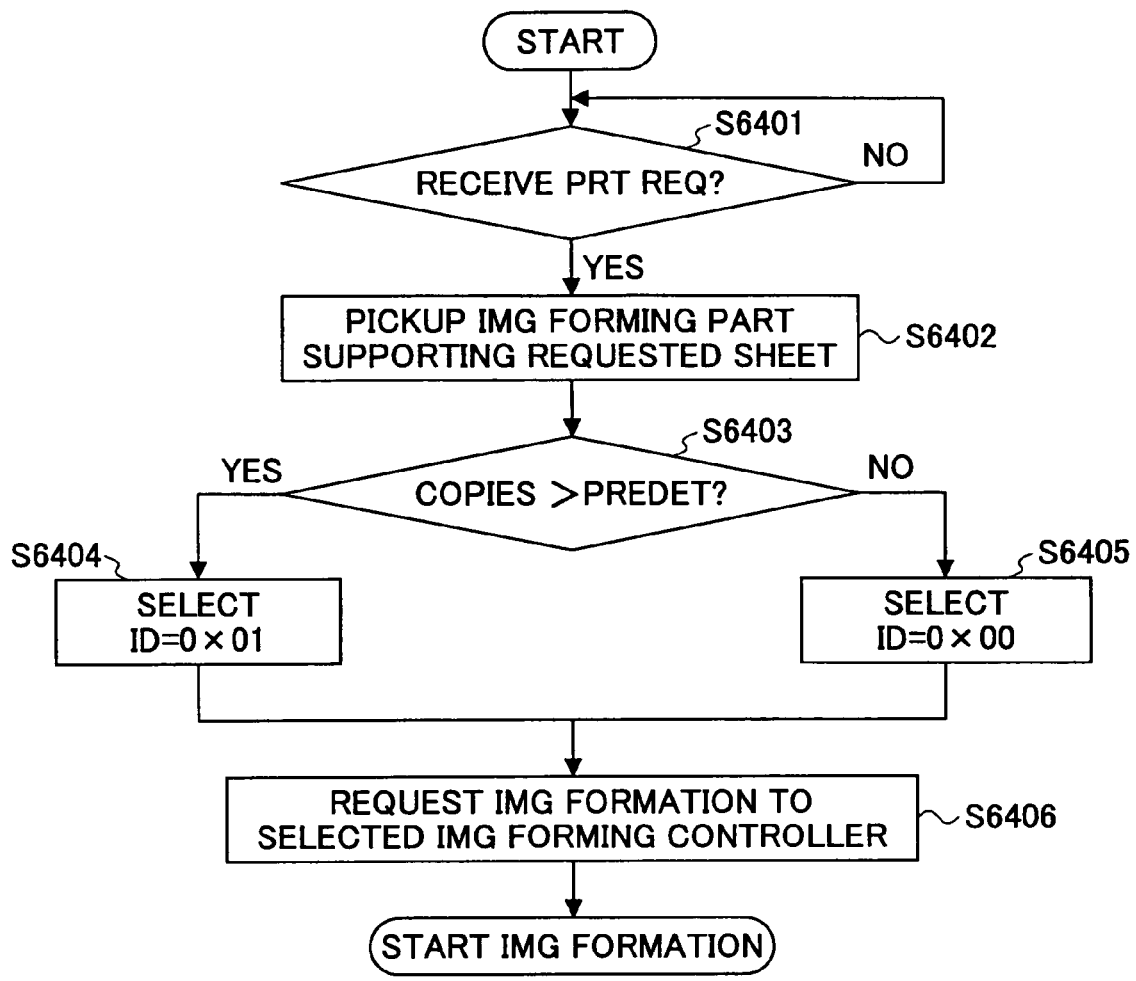
FIG. 17 is a flowchart showing the operation according to Operation 4 of to the second embodiment of the present invention.
Figure 18:
FIG. 18 is a diagram showing an information table according to Operation 4 of the second embodiment of the present invention.

FIG. 17 is a flowchart showing Operation 4 according to the present embodiment, while FIG. 18 represents the information memorized in the storage unit.

FIG. 18 shows the information memorized in the memory unit in advance, wherein it will be noted that the information held in the memory unit includes: the overall path length in the image forming apparatus: sheet feed speed; and the image forming speed of each image forming unit.

Referring to FIG. 17, discrimination is made in a step S6401 as to whether or not there is an incoming image formation request from the application 1108, and when such a request is accepted by the system controller 1101 (YES in step S6401), the system controller selects the image forming part or parts to be used based the requested number of copies and the supported sheet information shown in FIG. 16 in a step S6402.

In the case the requested image formation uses a plain paper for the recording sheet, for example, both image forming parts of 0x00 and 0x01 are available. See FIG. 16.

When there are such plural image forming parts that can be used for the desired image formation in the image forming apparatus, a predetermined value is derived based on the information memorized in the memory unit (see FIG. 19), and the required number of copies is compared with the foregoing predetermined value in a step S6403.

Figures 19, 20:
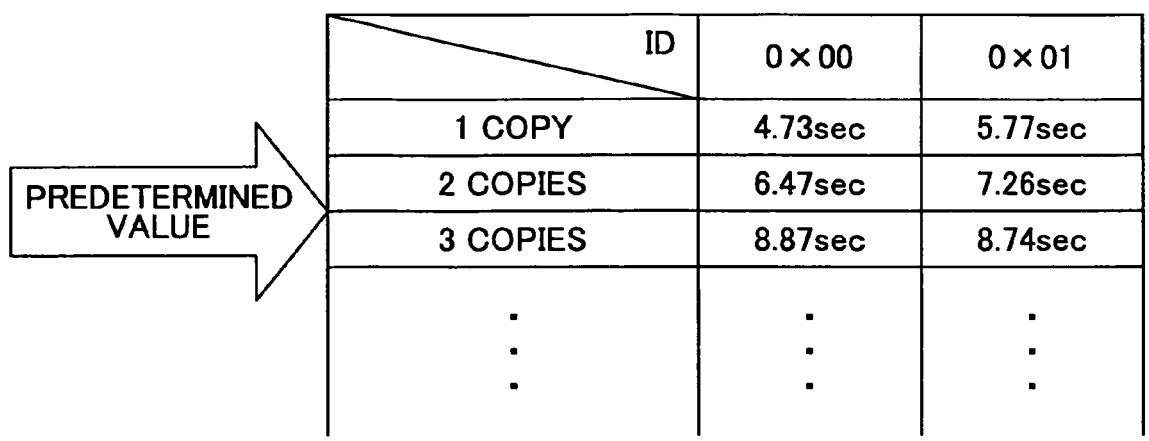
FIG. 19 is a diagram showing an information table according to Operation 4 of the second embodiment of the present invention.
FIG. 20 is a diagram showing an information table according to the third embodiment of the present invention.

FIG. 19 shows the image formation time of the image forming parts 9-2 and 9-1 for the case of forming monochromatic image of A4 size.

As can be seen in FIG. 19, the image forming time is smaller with the image forming part (ID=0x00) when the number of copies is one or two, while when the number of copies is three or more, the image forming time becomes shorter when the image forming part 9-1 (ID=0x01) is used.

Thus, with such a case, the image forming part having the device ID of 0x00 is selected in a step S6404 when the requested number of copies is larger than the predetermined number (YES in step S6403), while in the case the requested number of copies is smaller than the predetermined value (NO in step S6403), the image forming part of the ID of 0x00 is selected in a step S6405.

After such selection of the image forming part that provides shorter image formation time, the system controller 1101 issues a request of image formation to the image forming controller 1104 in a step S6406.

Thus, according to Operation 1 of the present embodiment, it becomes possible to select a most appropriate image forming part at the time of executing the image forming processing requested by the operator, by holding the recording sheet information indicative of the type of the sheet supported by the image forming part for each of the image forming parts.

According to Operation 2 of the present embodiment, it becomes possible to select the most appropriate image forming part, when a request of image formation has been issued by the operator, by judging the support or no support of sheet feed unit for each of the image forming parts based on the recording sheet information of the recording sheet supported by the image information part and the recording sheet information of the recording sheet set to the sheet-feed inlet of the image forming apparatus.

Further, according to Operation 3 of the present embodiment, it becomes possible to select a most appropriate image forming unit in the image forming apparatus of any system configuration when a request for image formation has been issued by the operator, by holding the support information of recording sheet for each of the image forming parts together with the information related to the sheet feed unit and the sheet discharge unit that can be relatively easily mounted and dismounted and further the information regarding to the different sheet feed paths, which are formed as a result of use of plural image forming parts.

Further, according to Operation 4 of the present invention, it becomes possible for the operator of the image forming apparatus to request image formation to the most appropriate image forming unit that performs the requested image formation with shortest image formation time, by holding the recording sheet support information together with the information regarding to different sheet feed path lengths and difference of image formation speed for each of the image forming units.

Third Embodiment

Next, a third embodiment of the present invention will be explained wherein it will be noted that the present embodiment uses the same image forming apparatus of FIG. 1 used with the first embodiment in combination with the hardware construction and software construction of FIGS. 2 and 3 that are used also with the first embodiment.

FIG. 20 is a diagram showing an example of the information for the sheet size code and sheet size used with the image forming apparatus of the present embodiment, while FIG. 21 is a diagram showing the positional relationship between the various image forming units (image forming part) mounted in the image forming apparatus and various sheet feed trays (sheet feed source). In the present embodiment, the IDs of the image forming parts and the IDs of the sheet feed trays are allocated in the ascending order from the lowermost mounting position in the image forming apparatus.

Figures 23, 24:
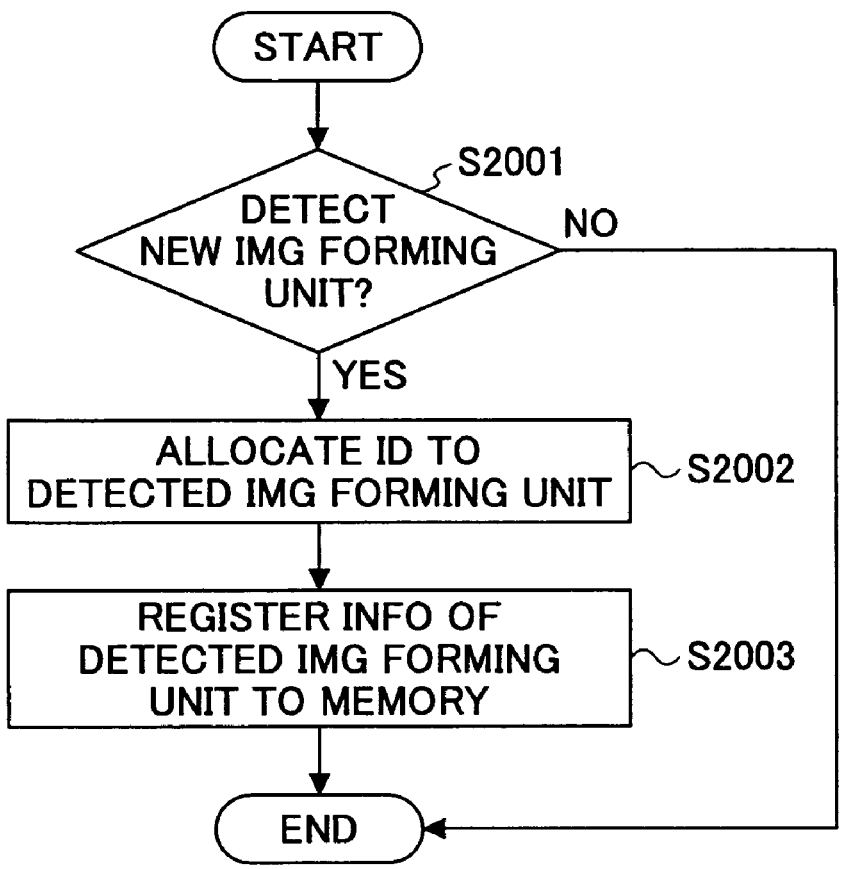
FIG. 23 is a flowchart showing the operation according to the third embodiment of the present invention.
FIG. 24 is a diagram showing an information table according to the third embodiment of the present invention.

FIG. 23 shows the flow of information registration for the case the information held in the memory unit is the information of the image forming part.

Referring to FIG. 23, examination is made whether there is a now image forming part in a step S2001.

Thus, when existence of a now image forming part is detected (YES in step S2001), an ID is allocated to the detected image forming part in a step S2002 and the information of the image forming unit is registered in the memory unit in a step S2003 together with the ID thereof. FIG. 24 shows an example of the information table held exclusively in the memory unit.

In the case an image forming part is dismounted, the ID of the dismounted image forming unit is set to vacant state and the information held in that ID is discarded. Thus, the information columns of ID2 and ID3 of FIG. 24 are turned to be blank. Further, similar modification of the information table is made with regard to the information of the sheet feed trays.

[Operation 1]

Referring to FIG. 23, at the moment the system controller 1101 has received the request for image formation, the memory unit already holds the information with regard to the mounting state (mounted/not-mounted state) of the respective image forming parts together with the information about the supported sheet size.

Figures 25, 26:
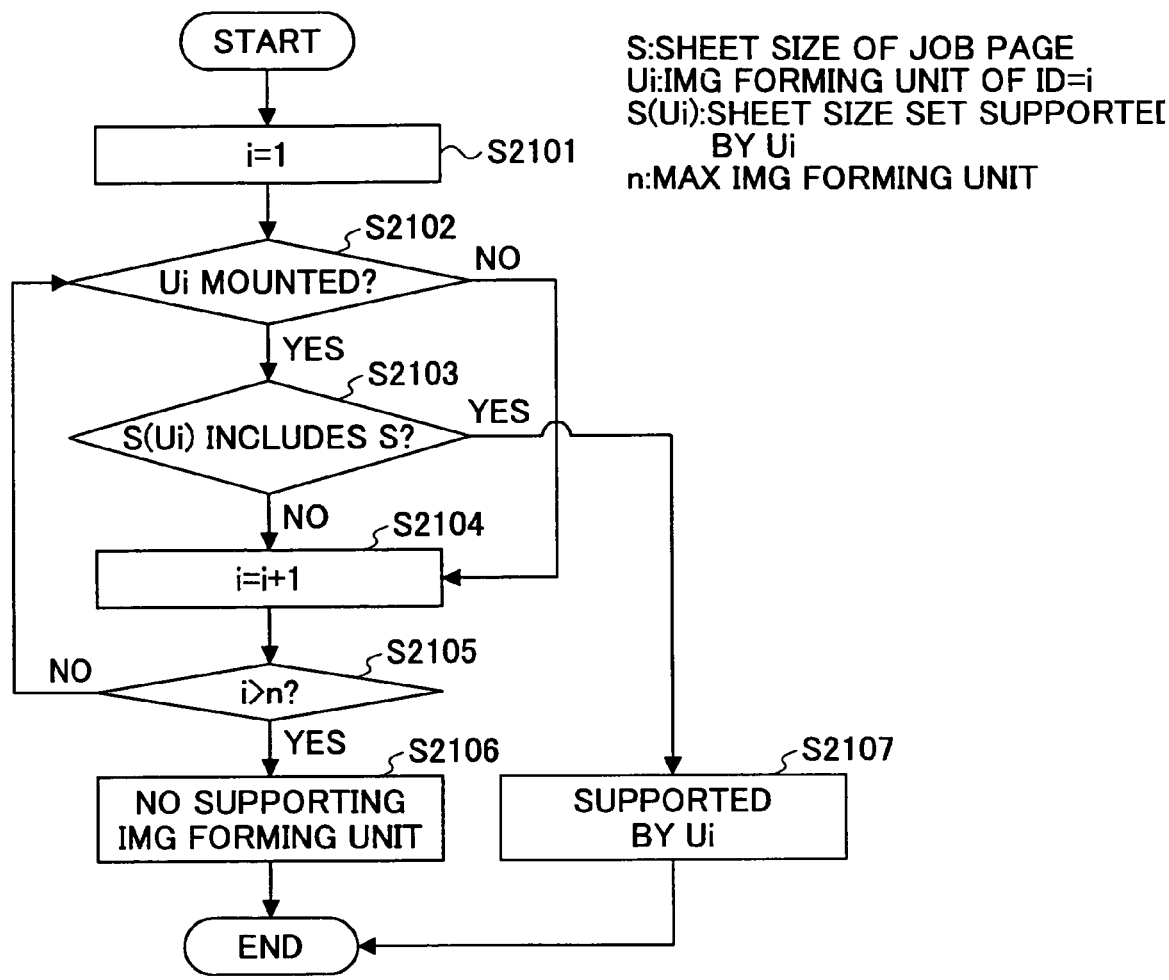
FIG. 25 is a flowchart showing the operation according to Operation 1 of the third embodiment of the present invention.
FIG. 26 is a diagram showing an information table according to Operation 1 of the third embodiment of the present invention.

FIG. 26 shows an example of the information table held in the memory unit.

Referring to FIG. 26, the sheet size supported by the image forming unit of the ID=1 is represented as S(U1={S2, S3, S4, S5, S6, S7}. Referring to FIG. 20, this means that the image forming part supports the sheet of B4 size or smaller. On the other hand, the sheet of A3 size is not supported.

FIG. 25 shows an example of the flow of determining the image forming part to be used for the processing based on the foregoing information.

Referring to FIG. 25, examination is made in the steps S2101-S2105 as to whether or not the sheet size S of the job page is supported, by starting from the image forming unit U1 (ID-1).

More specifically, examination is made whether or not the ID of the image forming part is 1 in a step S2101, and examination is made in a step S2102 as to whether or not the image forming part of U1 is mounted.

When the image forming part is mounted (YES in step S2102), a further examination is made as to whether or not the set of the sheet size ID supported by U1 includes the sheet size S of the job page, by referencing to the table of FIG. 26 (step S2103).

When the sheet size S of the job page is included (YES in step S2103), it is judged that there exists a corresponding image forming part, and it is determined to handle the image formation request with this image forming part U1.

When the sheet size S of the job page is not included in the foregoing set (NO in step S2104), the next part is subjected to the examination in a step S2104, and the foregoing examination is made for all of the mounted image forming parts (NO in S2105; S2102-S2104).

Further, when the number of the image forming parts exceeds the maximum number of the image forming parts that are mountable on the image forming apparatus (YES in step S2105), in other words, when all the mounted image forming parts are examined, it is determined that there is no image forming part that supports the requested image formation in a step S2106).

Even when sheets of different sizes are included in the job, the system controller 1101 can identify the image forming part supporting that page without inquiring each of the image forming parts, by repeating the foregoing determination flow for each page.

[Operation 2]

With the instant operation, too, the memory unit already holds the information with regard to the mounting state (mounted/not-mounted state) of the respective image forming parts together with the information about the supported sheet size. Further, as shown in FIG. 29, the information with regard to the mount state of sheet feed part and the information about the sheet size supported by the sheet feed tray are held in the memory unit for each of the sheet feed trays.

FIG. 30 is the information table created based on FIGS. 28 and 29, wherein FIG. 30 shows the supported sheet size for various combinations of the image forming parts and the sheet feed trays. Further, FIG. 31 shows the sheet path length L (UiTj) of the currently mounted combination derived from FIG. 21.

Figure 27:
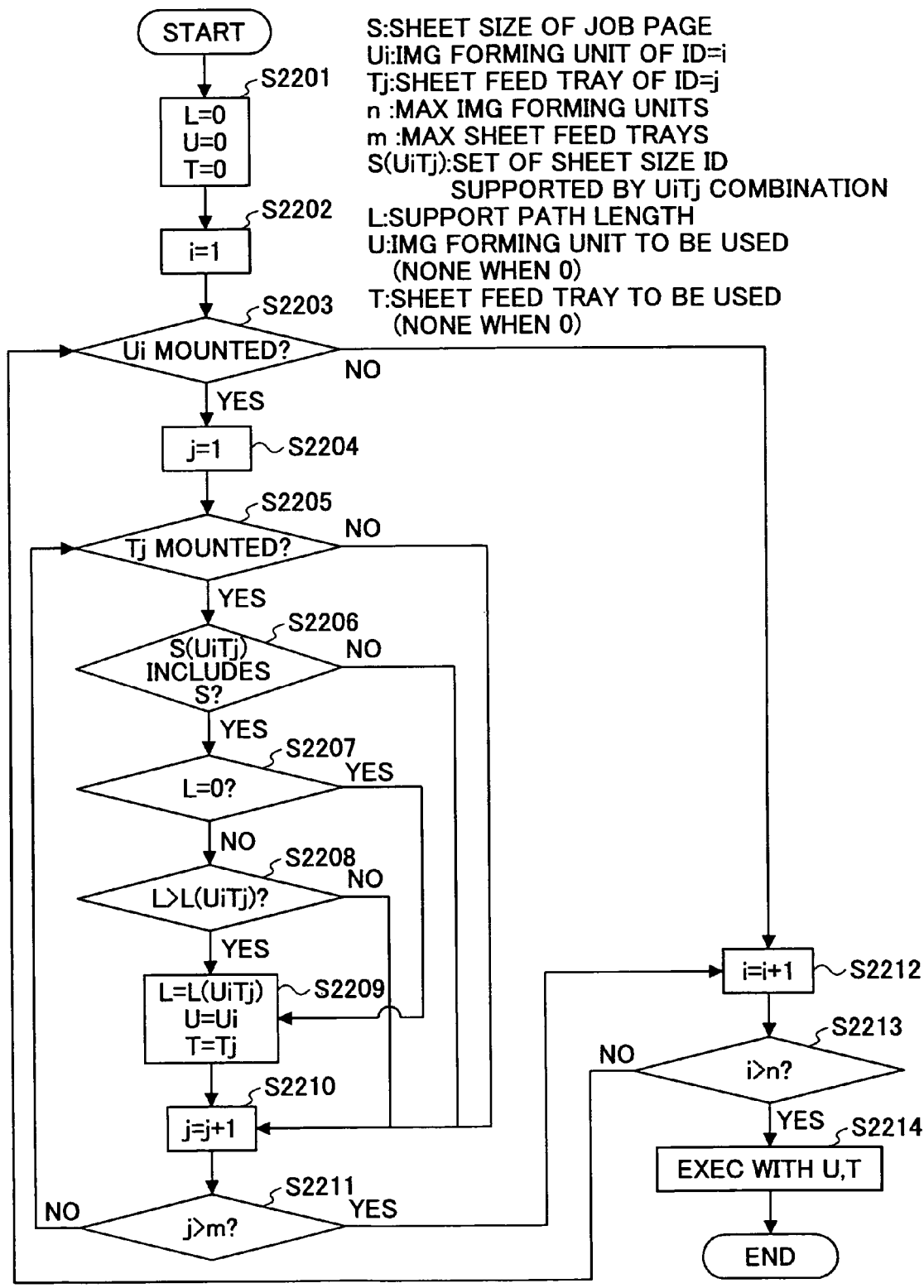
FIG. 27 is a flowchart showing the operation according to Operation 2 of the third embodiment of the present invention.

FIG. 27 shows an example of the flowchart determining the combination of the image forming part and the sheet feed tray to be used for the image formation of the current page based on the foregoing various information of FIGS. 28-31.

In the description hereinafter, the minimum sheet feed distance achievable by supported combination is designated as L, while the image forming part to be used for the image formation is designated as U and the sheet feed tray used for the image forming processing is designated as T.

In a step S2201, initialization is conducted and the zero is substituted into these parameters.

Next, in the steps S2202-S2206, examination is made as to whether it is possible that the sheet size of the job page is supported or not, wherein the examination is conducted consecutively over the combinations of the image forming part U1 and the sheet feed tray T1.

First, examination is made as to whether or not the image forming part of U1 is mounted in the steps S2202 and S2203.

When the image forming part of U1 is mounted (YES in step S2203), examination is made whether or not the sheet feed tray of T1 is mounted in the steps S2204 and S2205.

When the sheet feed tray T1 is mounted (YES in step S2205), it is decided in the step S2206 as to whether or not the sheet size set S of the job space is included in the set of the sheet size (U1T1) supported by the combination of U1 and T1.

In the event the sheet size S of the job space is included in the sheet size set S (YES in step S2206), it is examined in a step S2207 as to whether or not the sheet feed path length L supported by the foregoing combination is zero.

On the other hand, in the case L is not zero (NO in the step S2207), it is decided in a step S2208 as to whether or not the L(UiTj) is smaller than L based on the information shown in FIG. 31.

In the case the value of L(UiTj) is smaller (YES in step S2208), it is set such that L=L(UiTj), U-U1, T=T1 in a step S2209.

Further, it is decided with regard to the next sheet feed tray ID (Step S2210) as to whether or not the next sheet feed tray ID exceeds the maximum number of the sheet feed trays that can be mounted on the image forming apparatus (step S2211).

When the value of the next sheet feed tray ID is large (YES in step S2211), the ID of the next image forming part is selected (step S2212), and examination is made as to whether or not the ID thus selected exceeds the maximum number of the image forming parts that can be mounted on the image forming apparatus (step S2213).

When the ID value of the next image forming part exceeds the maximum number (YES in step S2211), the image formation is carried out by using the image forming part and the sheet feed tray determined by the step S2209.

Summarizing above, the present embodiment determines, when there is a supporting combination of image forming part and sheet feed source (YES in step S2206) and that the combination provides a shorter sheet path length as compared with the sheet path lengths of other supporting combinations (YES in step S2208), to carry out the processing with this supporting combination (steps S2209-S2214). When U=0 and T=0, this means that there is no corresponding combination.

[Operation 3]

FIG. 33 shows an information table memorized in the memory unit of the image forming apparatus and represents the supported sheet size information of the image forming part and the image formation time of the image forming part. Further, FIG. 34 shows the information similar to the one shown in FIG. 29, FIG. 35 shows the information similar to the one shown in FIG. 30, and FIG. 36 shows the information similar to the one shown in FIG. 31. Further, FIG. 37 is an information table created based on FIGS. 33, 35 and 36 and shows the time Q (UiLj) from the start of sheet feeding to the completion of image formation for the case of carrying out the processing by various combinations of the image forming parts and the sheet feed trays. In the present embodiment, it is assumed that the speed S of sheet feeding is constant irrespective of the type or kind of the sheet. Further, it is assumed that the time after image formation to the sheet discharge is identical through the image forming parts. Thus, there holds the relationship Q=L/S+R.

Figure 32:
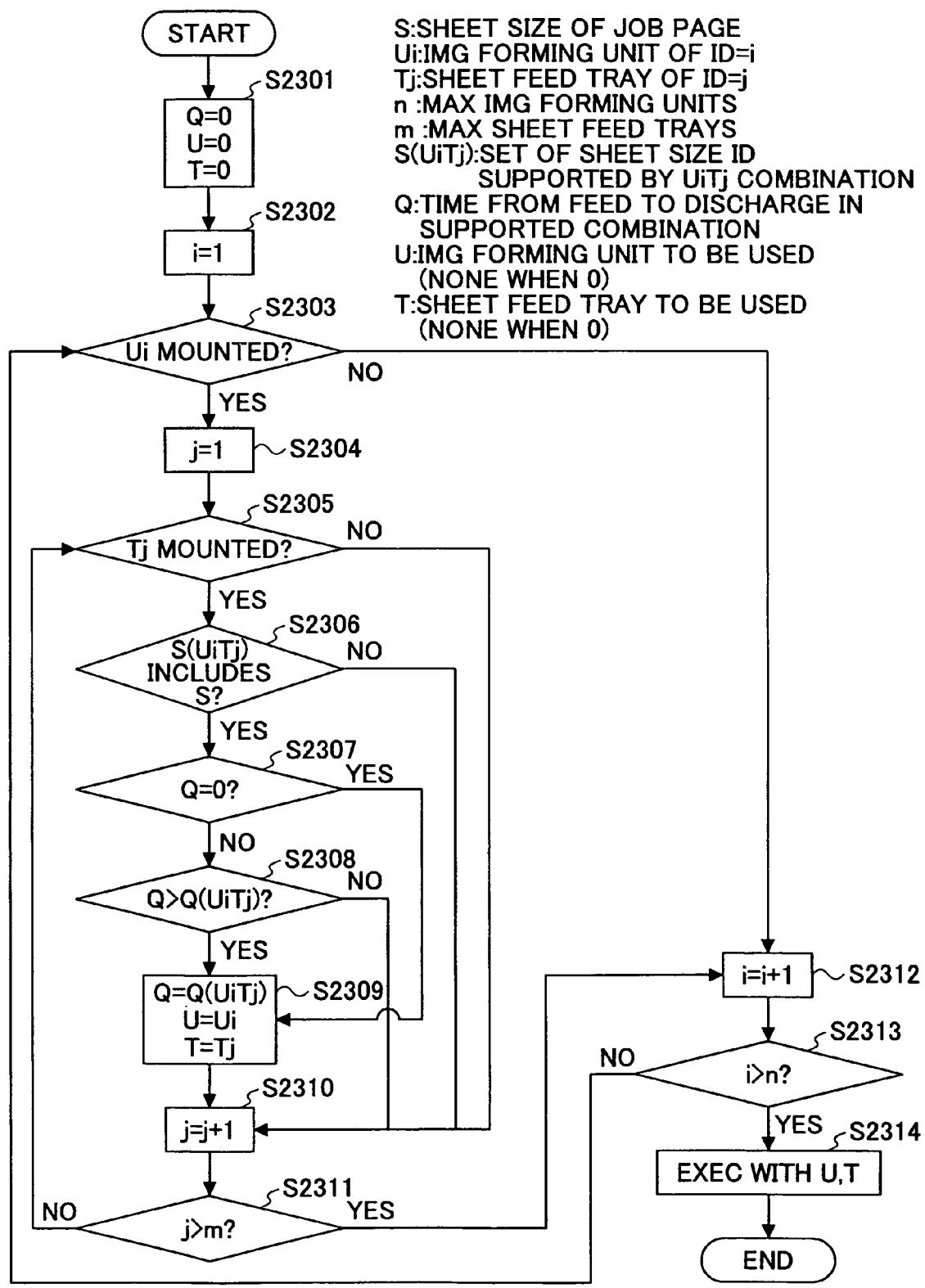
FIG. 32 is a flowchart showing the operation according to Operation 3 of the third embodiment of the present invention.

FIG. 32 shows an example of the process flow for determining the appropriate image forming part and the sheet feed tray used for the processing based on the foregoing various information of FIGS. 33-37.

Hereinafter, the minimum time from the sheet feeding to the sheet discharging among various supporting combinations will be designated as Q, the image forming part used for the processing will be designated by U and the sheet feeding tray used for the processing will be designated as T. In the initial state of step S2301, an initial value of zero is entered into each of Q, U and T.

Further, in the steps of S2302-S2306, examination is made systematically as to whether or not the sheet size S of the job page is supported for various combinations of the image forming unit U1 and the sheet feed tray T1.

First, examination is made whether or not the image forming part of U1 is mounted in steps S2302 and 2303.

Thus, when the image forming part U1 is mounted (YES in step S2303), examination is made as to whether or not the sheet feed tray T1 is mounted (steps S2304 and S2305).

When the sheet feed tray T1 is mounted (YES in step S2305), examination is made as to whether or not the sheet size S of the job state is included in the sheet size set (U1T1) indicative of the sheet sizes supported by the combination of U1 and T1 based on the information of FIG. 35 (step S2306).

Thus, when the sheet size S of the job space is included (YES in step S2306), examination is made as to whether or not the time Q from the sheet feeding to sheet discharging for the supported combination is zero (step S2307).

When Q is not zero (NO in step S2307), it is decided as to whether or not Q(UiTj) is smaller than Q based on the information shown in FIG. 37 (step S2308). When the value of Q(UiTj) is smaller (YES in step S2308), it is set that Q=Q (UiTj), U=Ui, T=Tj (step S2309), and a next sheet feed tray ID is selected (step S2310), and it is decided as to whether or not the selected ID exceeds the maximum number of the sheet feed tray that can be mounted on the image recording apparatus (step S2311).

When this next sheet feed tray ID is larger (YES in step S2311), examination is made as to whether or not the next image forming part ID exceeds the maximum number of the image forming parts that can be mountable upon the image forming apparatus (step S2313).

When the value of the next image forming unit ID is larger (YES in step S2311), image formation is carried out by the image forming part and the sheet feed tray decided in the step S2309 (step S2314).

Summarizing above, the present invention carries out the image formation processing, when there is a supporting combination of image forming part and the sheet feed tray (YES in step S2306) and when the time needed for processing with this specific combination is shorter than the time needed in other combinations (YES in step S2308), by using this specific combination (steps S2309-S2314). Here, it should be noted that there exists no supporting combination when U=0 and T=0.

According to Operation 1 of the present embodiment, in which the information related to the size of the recording sheet supported by various image forming parts, unified management is achieved for the information of the recording sheets supported by various image forming parts, and the system controller can allocate the image forming parts most suited for the request of the operator efficiently based on the size information of the recording sheet, without sending inquiries to the respective image forming units individually.

According to Operation 2 of the present embodiment, it becomes possible to achieve unified management of the information related to the size of the recording sheet supported by various image forming parts, the information related to the size of the recording sheet set to the respective sheet feed trays, and the information related to the sheet feed path lengths from the respective sheet feed trays to the respective image forming units, and the system controller can select the most efficient combination of image forming part and sheet feed tray for printing based on the size information of the recording sheet, without sending inquiries to the respective image forming parts individually. Thereby, the speed of printing is improved.

According to Operation 3 of the present embodiment, it becomes possible to achieve unified management of the information related to the size of the recording sheet supported by various image forming parts, the information related to the size of the recording sheet set to the respective sheet feed trays, the information related to the sheet feed path lengths from the respective sheet feed trays to the respective image forming parts, and the information about processing time of the various image forming units, and the system controller can select the most efficient combination of image forming part and sheet feed tray for printing based on the size information of the recording sheet without sending inquiries to the respective image forming parts individually, even in case plural image forming units of different image forming time are mounted on the image forming apparatus. Thereby, the speed of printing is improved.

Fourth Embodiment

Next, a fourth embodiment of the present invention will be explained wherein it will be noted that the present embodiment uses the same image forming apparatus of FIG. 1 used with the first embodiment in combination with the hardware construction and software construction of FIGS. 2 and 3 that are used also with the first embodiment.

[Operation 1]

The present operation is identical to Operation 1 of the first embodiment, except for the information handled.

Thus, FIG. 5 represents the flowchart of the present operation, while FIG. 38 represents the information memorized in the memory unit.

Referring to FIG. 5, the system controller 1101 executes, in response to power on in a step S5101, initialization of the system in a step S5102, and searches for a new image forming part in a step S5103.

When the result of the step S5103 is YES and a new image forming part is detected, the system controller 1101 creates a new image forming part controller 1104 in a step S5104.

Further, in a step S5105, the image forming part ID is allocated to the image forming part controller newly discovered in the step S5103 as shown in FIG. 38 so that the system controller 1101 can discriminate the newly discovered image forming part controller.

It should be noted that each image forming part controller 1104 memorizes the duplex print support information of each image forming part (designated by the numerals 9-1 and 9-2 in FIG. 1) in the memory unit as shown in FIG. 38 based on the information acquired from the image forming parts 760 and 770. Reference should be made to FIG. 6.

In the present embodiment, the memory unit may be provided to any of the system controller 1101, the memory controller 1106, the image forming part controller 1104, and the like.

[Operation 2]

Figure 40:
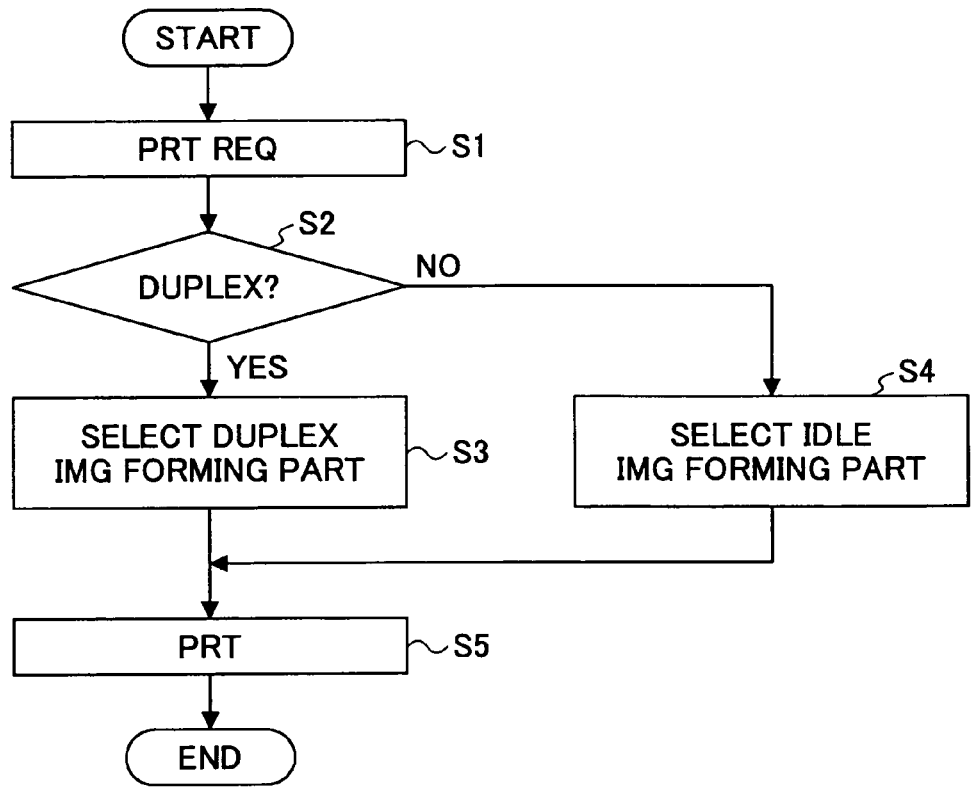
FIG. 40 is a diagram showing the operation according to Operation 2 of the fourth embodiment of the present invention.

FIG. 40 is a flowchart showing Operation according to the present embodiment.

Thus, after reception of the print request (job reception) from the operator, the system controller 1104 discriminates whether or not the job is a duplex print request (step S2).

When the request of the operator is duplex printing (YES in step S2), the image forming part supporting the duplex printing is selected based on the information shown in FIG. 38 (step S3), and the requested printing is executed (step S5). When it is not the duplex printing (NO in step S2), the controller 1104 selects an appropriate image forming part in the idling state (step S4), and printing is executed (step S5).

[Operation 3]

Figure 41:
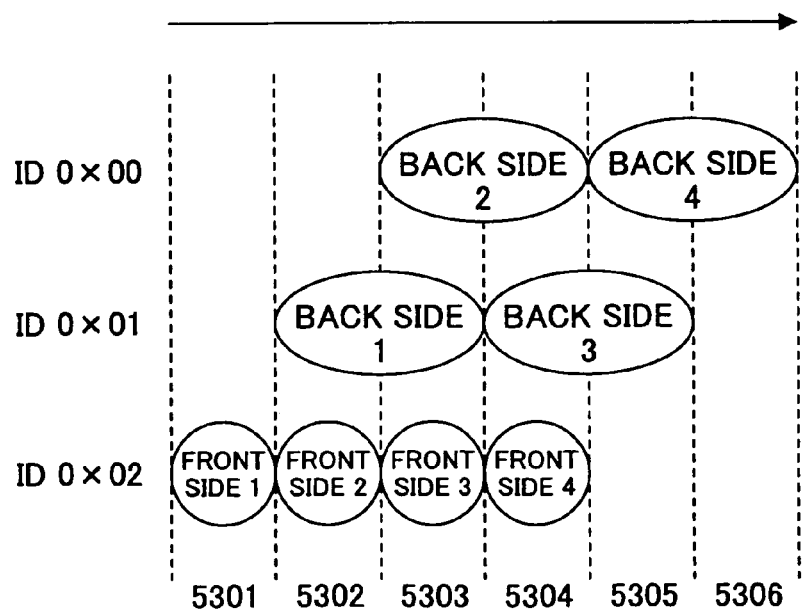
FIG. 41 is a diagram schematically showing print transition according to Operation 3 of the fourth embodiment of the present invention.

FIG. 41 is a print state transition diagram (map) related to the operation of the present embodiment. Further, FIG. 39 shows the information memorized in the memory unit. With the present embodiment, print speed information (image formation speed information) is held in addition to the duplex print support information as shown in FIG. 39.

It should be noted that the system controller creates the use map of the image forming parts for each page, when received a print request from the operator, before executing the job so that the throughput of printing is maximized.

For example, a case will be considered based on the table of FIG. 39, in which there are mixed an image forming part supporting duplex printing, an image forming part not supporting duplex printing, and an image forming part of different printing speed are mixed in the image forming apparatus.

Thus, as shown in FIG. 41, the image forming part 0x02 carries out printing of page 1 on a front side of a first sheet in a state 5301.

Further, in a state 5302, the image forming part 0x03 carries out printing of page 3 on a front side of a second sheet in a state 5302, and the image forming part 0x01 receives and turns back the first sheet printed by the image forming part 00x2.

Next, in a state 5303, the image forming part 0x02 carries out printing of page 5 on a front side of a third sheet and the image forming part 0x01 carries out printing of page 2 on a backside of the first sheet. Further, the image forming part 0x02 receives and turns back the second sheet.

In a state 5304, the image forming part 0x02 carries out printing of page 7 on a front side of a fourth sheet, the image forming part 0x01 receives and turns back the third sheet, and the image forming part 0x00 carries out printing of page 4 on a backside of the second sheet.

In a state 5305, the image forming part 0x01 carries out printing of a sixth page on a backside of the third sheet, and the image forming part 0x00 receives and turns back the fourth sheet.

In a state 5306, the image forming part 0x00 carries out printing of page 8 on a backside of the fourth sheet.

Thus, with the present embodiment, it is possible to increase the throughput by twice as compared with the case of merely using the image forming part supporting the duplex printing, by creating the usage map of the image forming parts optimum for duplex printing.

Thus, according to Operation 1 and Operation 2 of the present embodiment, unified management becomes possible for the duplex printability information of the respective image forming parts, and thus, the system controller can select the image forming parts supporting duplex printing efficiently in response to the request of the operator for image formation, without sending inquiries to the image forming parts individually.

Further, according to Operation 3 of the present embodiment, it becomes possible to achieve unified management of the duplex printability information and the print speed information for the respective image forming parts. Thus, it becomes possible to for the system controller to create the usage map of the image forming parts for duplex printing in response to the image formation request from the operator, without sending inquires to the respective image forming parts individually. With this, it becomes possible to increase the throughput of the duplex printing.

Fifth Embodiment

Next, a fifth embodiment of the present invention will be explained wherein it will be noted that the present embodiment uses the same image forming apparatus of FIG. 1 used with the first embodiment in combination with the hardware construction and software construction of FIGS. 2 and 3 that are used also with the first embodiment.

[Operation 1]

Operation 1 of the present embodiment is similar to that of Operation 1 of the first embodiment, except that the information dealt with is different.

FIG. 5 is a flowchart showing Operation 1 of the present embodiment while FIG. 42 shows the information memorized in a first memory unit.

Referring to FIG. 5, the system controller 1101 executes, in response to power on in a step S5101, initialization of the system in a step S5102, and searches for a new image forming part in a step S5103.

When the result of the step S5103 is YES and a new image forming part is detected, the system controller 1101 creates a new image forming part controller 1104 in a step S5104.

Further, in a step S5105, an image forming part ID, such as 0x00, 0x01, 0x02, and the like, is allocated to the image forming part controller newly discovered in the step S5103 as shown in FIG. 42 so that the system controller 1101 can discriminate the newly discovered image forming part controller.

It should be noted that each image forming part controller 1104 memorizes the color support information of each image forming part (designated by the numerals 9-1 and 9-2 in FIG. 1) in the first memory unit based on the information acquired from the image forming parts 760 and 770. Reference should be made to FIG. 6.

In the present embodiment, the first memory unit may be provided to any of the system controller 1101, the memory controller 1106, the image forming part controller 1104, and the like.

[Operation 2]

Figure 44:
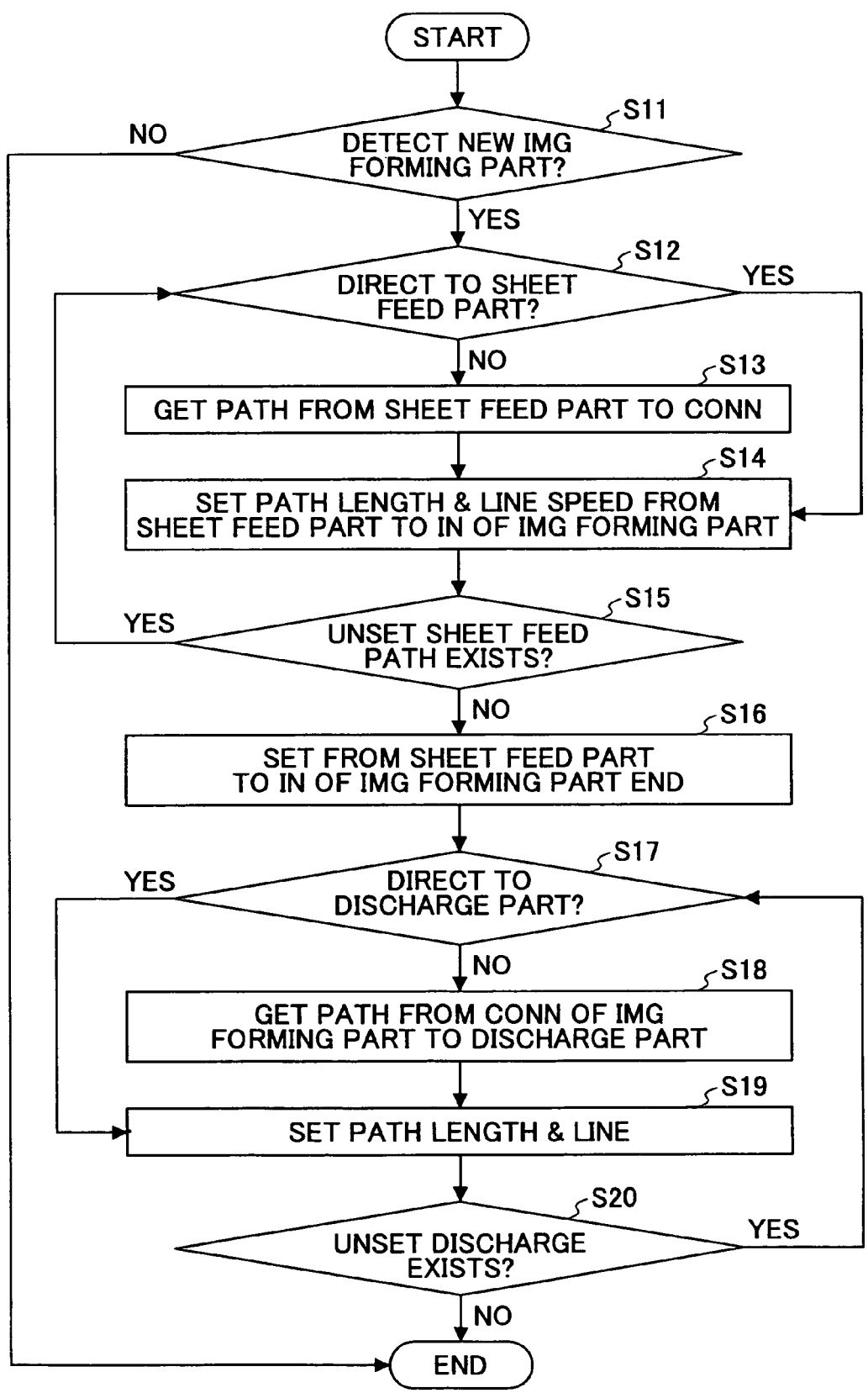
FIG. 44 is a diagram showing an information table according to Operation 2 of the fifth embodiment of the present invention.

FIG. 44 is a flowchart showing Operation 2 of the present embodiment.

Referring to FIG. 44, the case will be considered in which the newly connected image forming part is the image forming part 9-2 shown in FIG. 1. In this case, the sheet feed source and the image forming part 9-2 are connected with each other via the image forming part 9-1.

First detection is made in a step S11 as to whether or not the new image forming part is connected.

When no new image forming part is detected (NO in step S11), the process is terminated immediately, while when a new image forming part is detected (YES in step S11), it is judged in a step S12 as to whether or not the image forming part is connected directly to the sheet feed unit or sheet feed inlet.

When they are connected directly (YES in step S12), the path length to the inlet of the image forming part (shown by a thick line 10 in FIG. 22A) and a linear speed in a step S14.

Figure 22A:
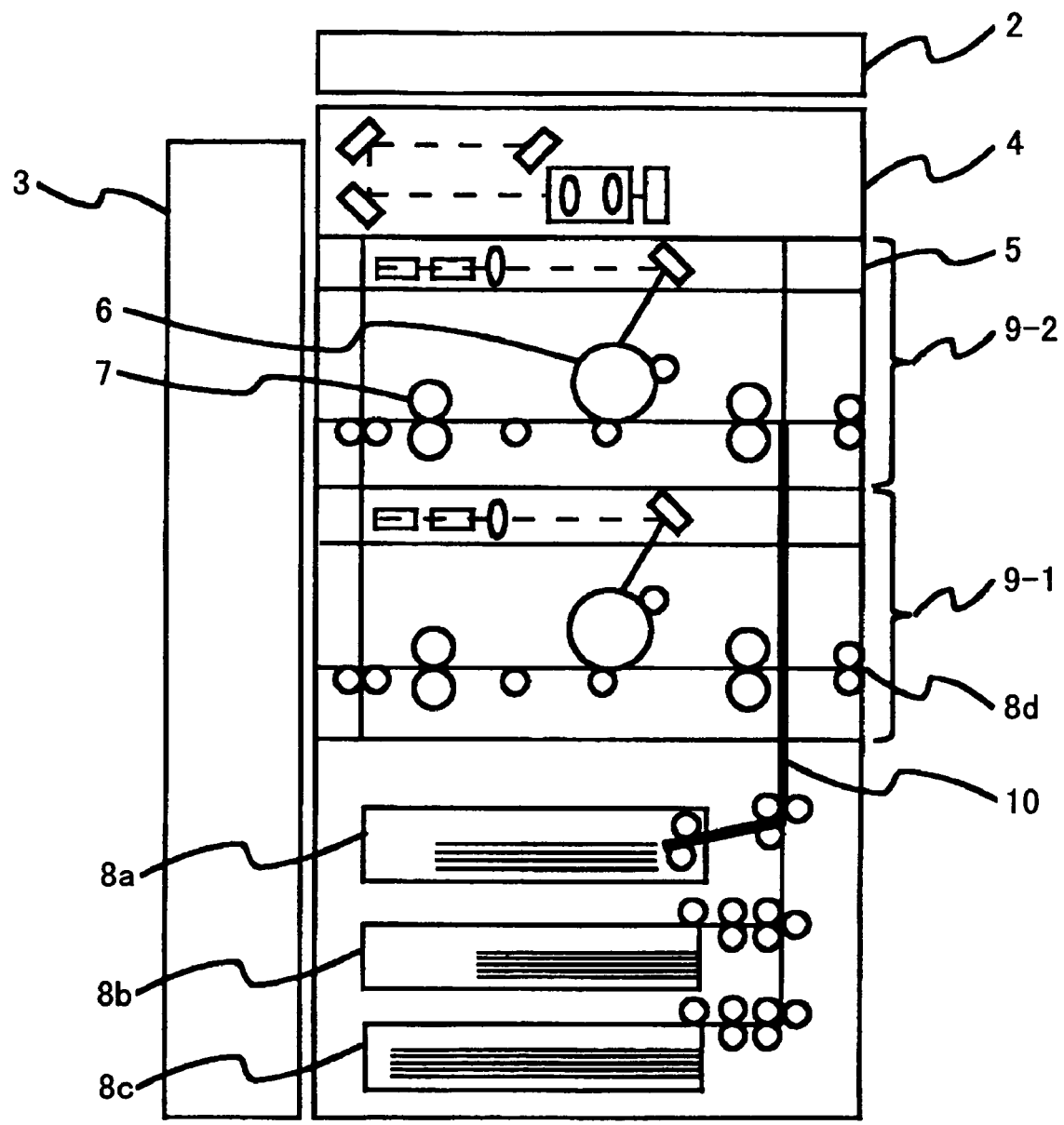
FIGS. 22A and 22B are diagrams showing the construction of an image forming apparatus according to Operation 2 of a fifth embodiment of the present invention in a schematic cross-sectional view.

When they are not connected directly (NO in step S12), a path length from the sheet feed source to the image forming part is acquired in a step S13 based on the information shown in FIG. 43, and the path length to the inlet of the image forming part shown by the thick line 10 in FIG. 22A and the line velocity are set in a step S14.

Next, similar setting is made for all of the available sheet feed sources (YES in step S15 and steps S12-S14).

Figure 22B:
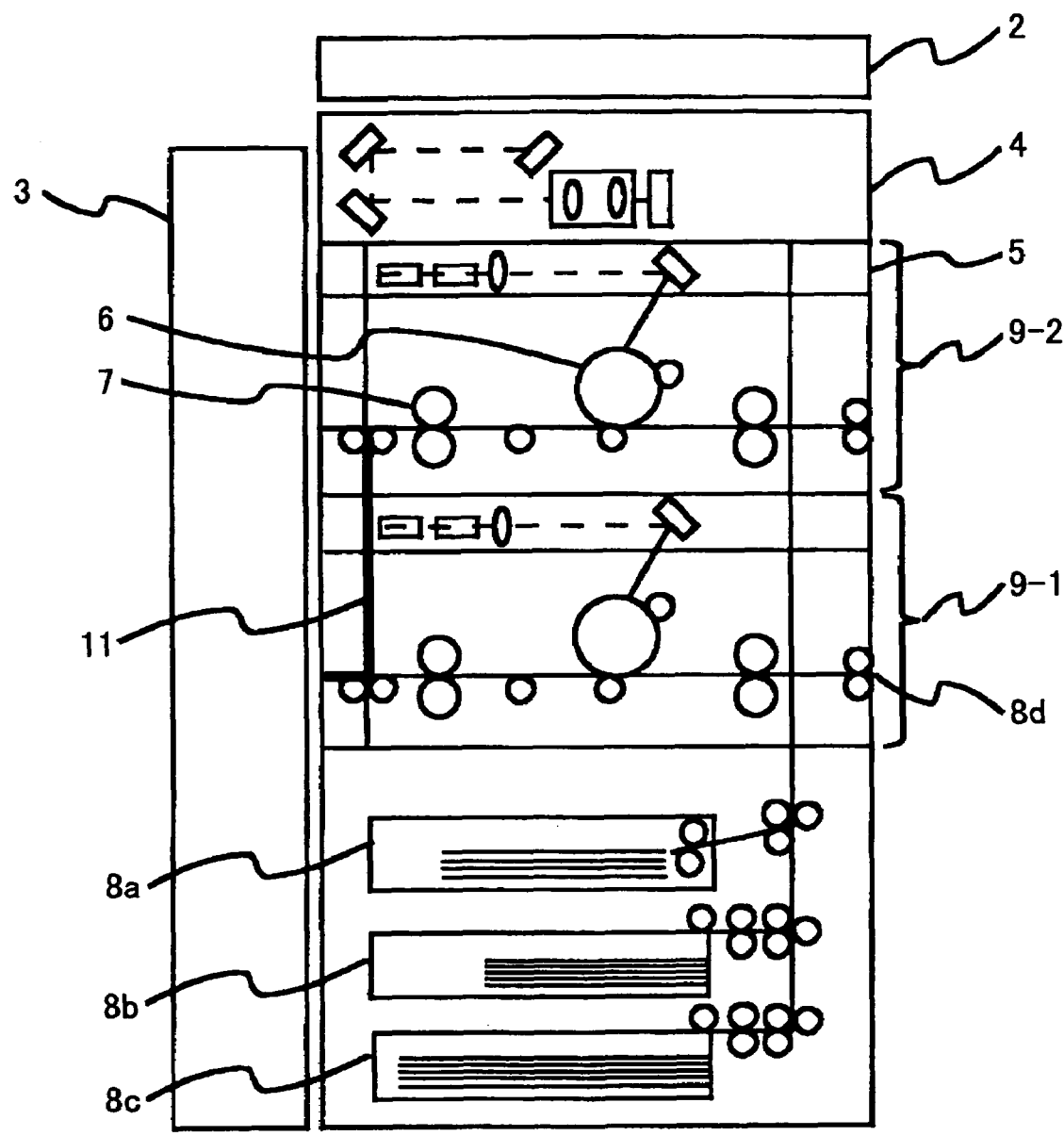

When there remains no sheet feed source not set up as noted before (NO in step S15), setting of a path from the outlet part of the image forming part to the sheet discharging part (sheet outlet) designated by a thick line 22 in FIG. 22B is conducted in steps S17-S18, after a step S16 for set up from the sheet feed source to the inlet part of the image forming part.

First, discrimination is made as to whether or not the newly discovered image forming part is connected directly to the sheet discharging part in a step S17. When they are connected directly (YES in step S17), the path shown by the thick line 11 in FIG. 22B is set from the outlet part of the image forming part to the discharge part and the line velocity.

When they are not connected directly (NO in step S17), the path length from the connection part of the image forming part to the discharge part is acquired in a step S18 based on the information shown in FIG. 43, and the path 11 shown in FIG. 22B by the thick line from the outlet part of the image forming part to the discharging part is set in a step S19 together with the line velocity.

Further, detection is made in a step S20 for the existence of unset discharging part, and if such unset discharging part exists (YES in step S20), the processing is repeated from the step S17. When there remains no unset discharge part (NO in step S20), the processing is terminated.

FIG. 43 shows an example of the information of the sheet feed path length from the sheet feed source to the sheet discharge part memorized in the first memory unit of the present embodiment.

[Operation 3]

FIG. 47 is a flowchart showing the operation of the present embodiment.

First, detection is made as to whether or not a new image forming part is connected (step S21).

When no new image forming part is detected (NO in step S21), the processing is terminated immediately.

When the image forming part 9-2 of FIG. 1 is detected as a new image forming part (YES in step S21), the path length information from the connection part of the image forming part 9-1 to the newly detected image forming part is set in a step S22 in the first memory unit in a step S22 in the form shown in FIG. 45.

Figure 50A:
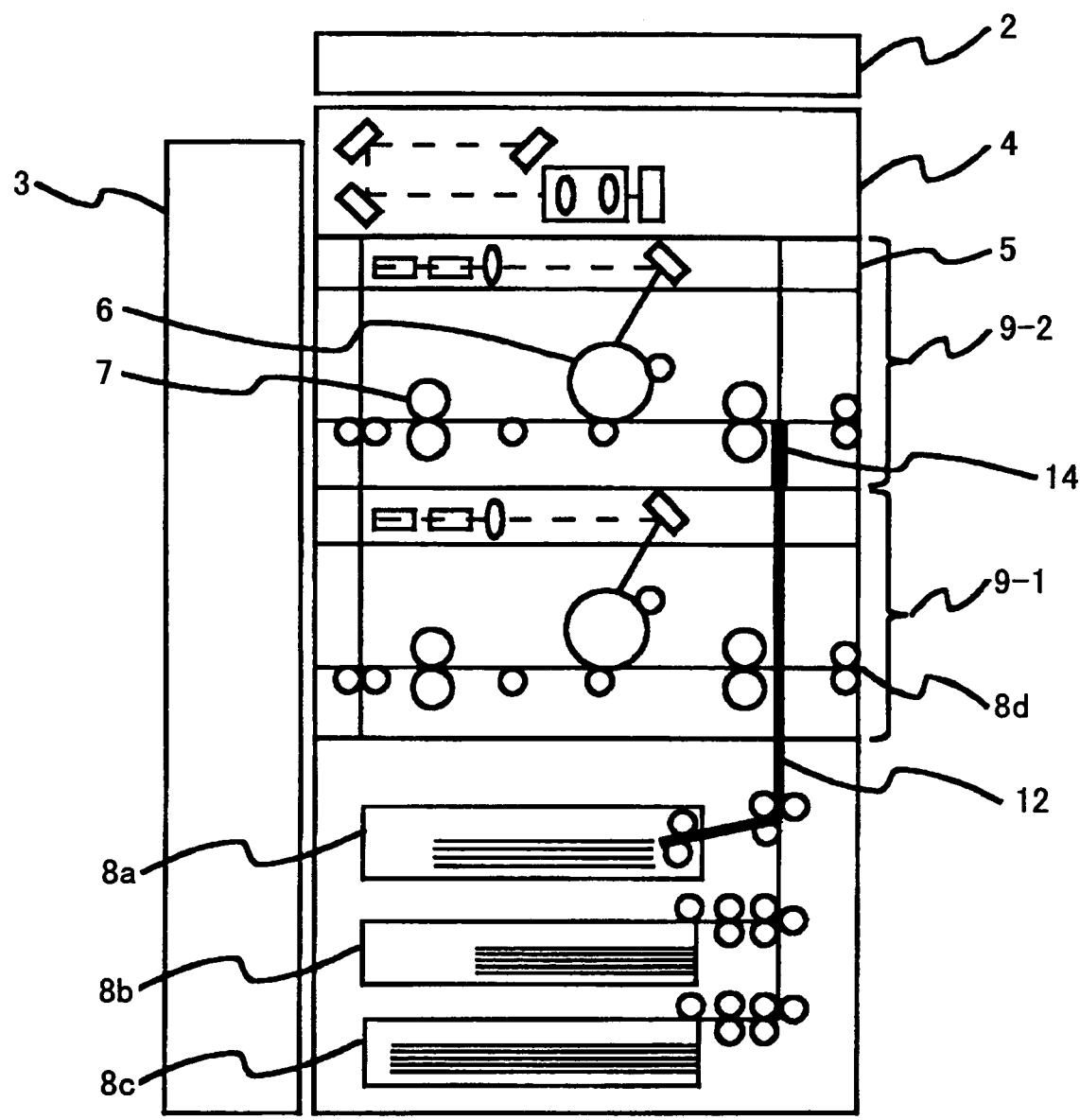
FIGS. 50A and 50B are diagrams showing the construction of an image forming apparatus according to Operation 3 of the fifth embodiment of the present invention in a cross-sectional view.

Further, the path length information form the sheet discharging part to the connection part of the image forming part 9-1 is memorized in a second memory unit as shown in FIG. 46, wherein it should be noted that this path length information is represented in the form of a sum of the path length from the sheet feed unit 8a to the connection part of the image forming unit 9-1 represented by a thick line 12 in FIG. 50A and the path length from the connection part of the image forming part 9-1 to the image forming part 9-2 represented in FIG. 50A by a thick line 14 (step S23).

Figure 50B:
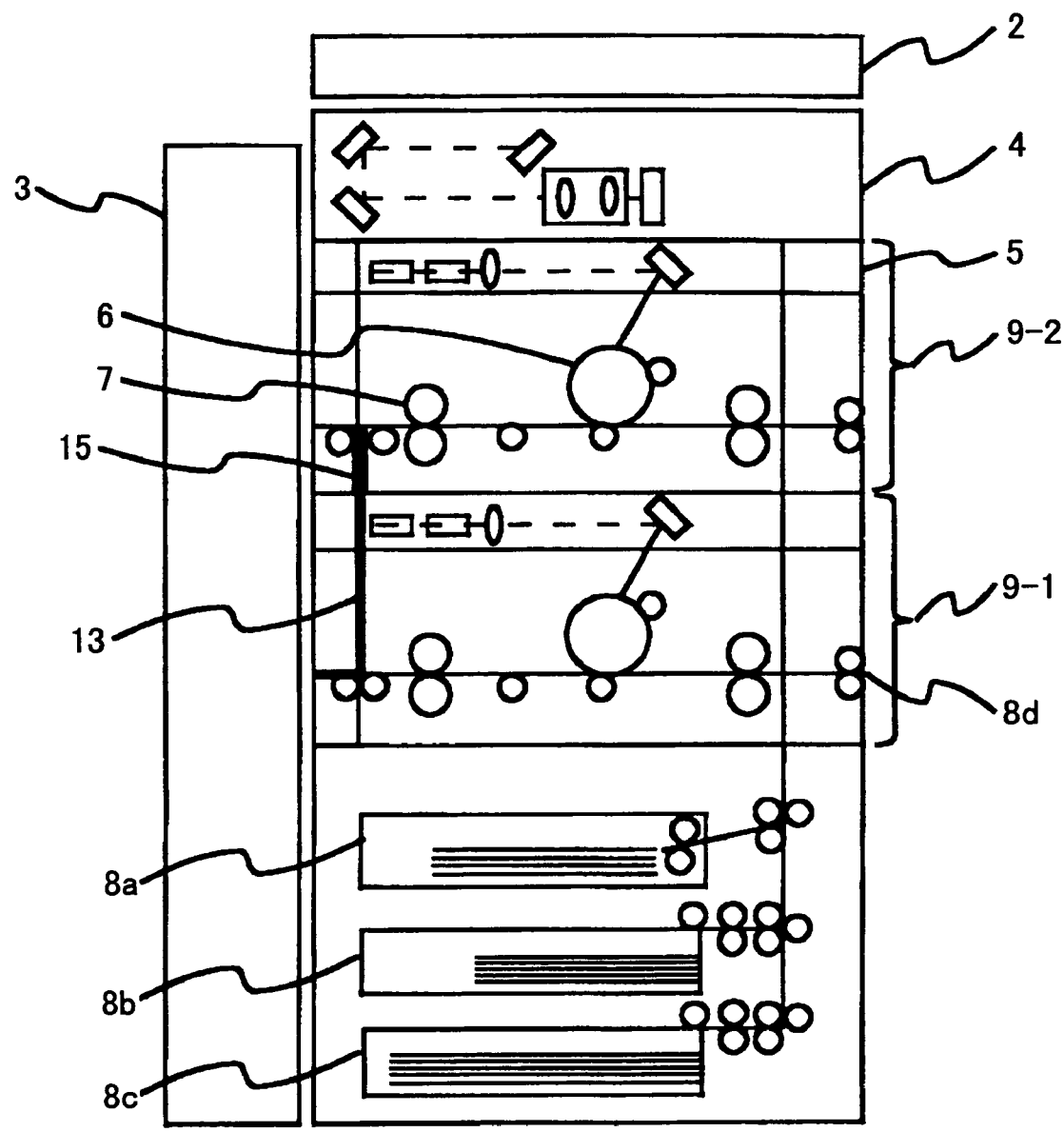

Setting of the discharging side is achieved similarly (steps S24-S27 and FIG. 50B).

Thus, it is judged whether or not the newly detected image forming part is connected directly to the discharging part (step S24).

When they are connected directly (YES in step S24), the path length information from the outlet part of the image forming part to the sheet discharging part is memorized in the first memory unit.

When they are not connected directly (NO in step S24), the path length information from the outlet part of the image forming part to the connection part of the image forming part is set in the first memory unit (step S25). Further, as shown in FIG. 46, the feed path length from the connection part of the image forming part to the sheet discharge part is set in the second memory unit (step S26). It should be noted that this path length information is represented as the sum of the path length of the thick line 13 and the path length of the thick line 15 shown in FIG. 50B.

As noted above, only the information of the second memory unit is changed with the present Operation in which the path lengths are set separately as shown in FIG. 46, in the case the number of the sheet feed source is increased by adding sheet feed units. Further, when the image forming part 9-2 is dismounted, for example, it is sufficient to delete the setting values only from the information in the first memory unit shown in FIG. 45.

[Operation 4]

FIG. 48 shows an example of the information set in the first memory unit with the present embodiment.

Referring to FIG. 48, it can be seen that the path, path length, image forming speed and the recording sheet feeding speed are held in the first memory unit.

FIG. 49, on the other hand, shows the example of the information set in the second memory unit of the present embodiment, wherein the second memory unit holds the overall path length and the feed speed for the entire image forming apparatus.

With regard to the sheet feed speed, optimization is conducted for the overall speed of the image forming apparatus, and thus, the sheet feed speed of the image forming part is set to 200 mm/sec for both of the image forming parts of ID=0x00 and ID=0x01 as long as they are mounted on this image forming apparatus, in spite of the fact that the image forming apparatuses themselves can handle a higher feeding speed.

[Operation 5]

Operation 5 of the present embodiment is basically the same as Operation 4 of the second embodiment, except that the step S6402 is eliminated with the present example. Hereinafter, Operation 5 of the present embodiment will be explained with reference to the flowchart of FIG. 17.

Referring to FIG. 17, discrimination is made in a step S6401 as to whether or not there is an incoming image formation request from the application 1108, and when such a request is accepted by the system controller 1101 (YES in step S6401), the system controller compares the requested copies with a predetermined value (step S6403). This "predetermined value" is derived from the values set to the first memory unit and the second memory unit shown in FIGS. 48 and 49 and the condition requested at the time of the current image formation.

Figure 51:
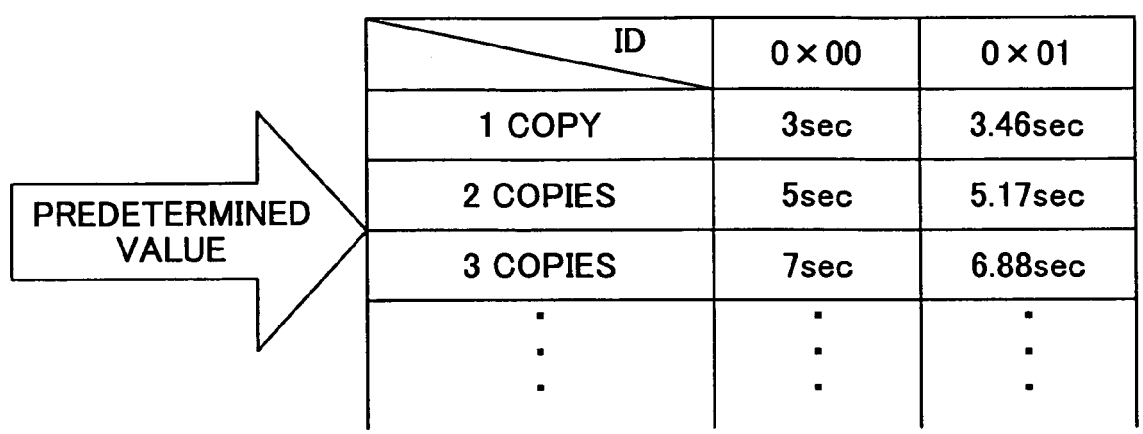
FIG. 51 is a diagram showing an information table according to Operation 5 of the fifth embodiment of the present invention.

FIG. 51 shows the image formation time of the image forming parts 9-2 and 9-1 for the case of forming monochromatic image of A4 size.

As can be seen in FIG. 51, the image forming time is smaller with the image forming part (ID=0x00) when the number of copies is one or two, while when the number of copies is three or more, the image forming time becomes shorter when the image forming part 9-1 (ID=0x01) is used.

Thus, with such a case, the image forming part having the device ID of 0x00 is selected in a step S6404 when the requested number of copies is larger than the predetermined number (YES in step S6403), while in the case the requested number of copies is smaller than the predetermined value (NO in step S6403), the image forming part of the ID of 0x00 is selected in a step S6405.

After such selection of the image forming part that provides shorter image formation time, the system controller 1101 issues a request of image formation to the image forming controller 1104 in a step S6406.

Thus, according to Operation 1 of the present embodiment, it becomes possible to select the image forming part efficiently in response to the image forming request from the operator, by holding the image forming speed data for each of the image forming parts.

Further, according to Operation 2 of the present embodiment, it becomes possible to select the mage forming part efficiently in response to the image forming request from the operator, by holding the information with regard to the difference of path length from the start of sheet feeding to the start of the image formation and the path length from the end of image formation to the sheet discharging, which is characteristic to the apparatus that includes plural image forming parts in a single image forming apparatus.

According to Operation 3 of the present embodiment, it becomes possible to update the information efficiently when increasing, decreasing the number of the image forming parts or replacing the image forming part, by memorizing the information related to the image forming part and the information related to the entire image forming apparatus separately in respective memory units.

According to Operation 4 of the present embodiment, it is possible to calculate the image forming speed at the time of the image forming request, by holding the information related to the image forming rate from starting of sheet feeding to the end of sheet discharging for the entire image forming system as in the example of Operation 5.

Further, according to Operation 5 of the present embodiment, it becomes possible to select the optimum image forming part for the image forming request, which is changed in each operation, by calculating the time needed for the image formation by taking into consideration the condition imposed at by the image formation request and the information held by the image forming apparatus.

Sixth Embodiment

Next, a sixth embodiment of the present invention will be explained wherein it will be noted that the present embodiment uses the same image forming apparatus of FIG. 1 used with the first embodiment in combination with the hardware construction and software construction of FIGS. 2 and 3 that are used also with the first embodiment.

Figure 52:
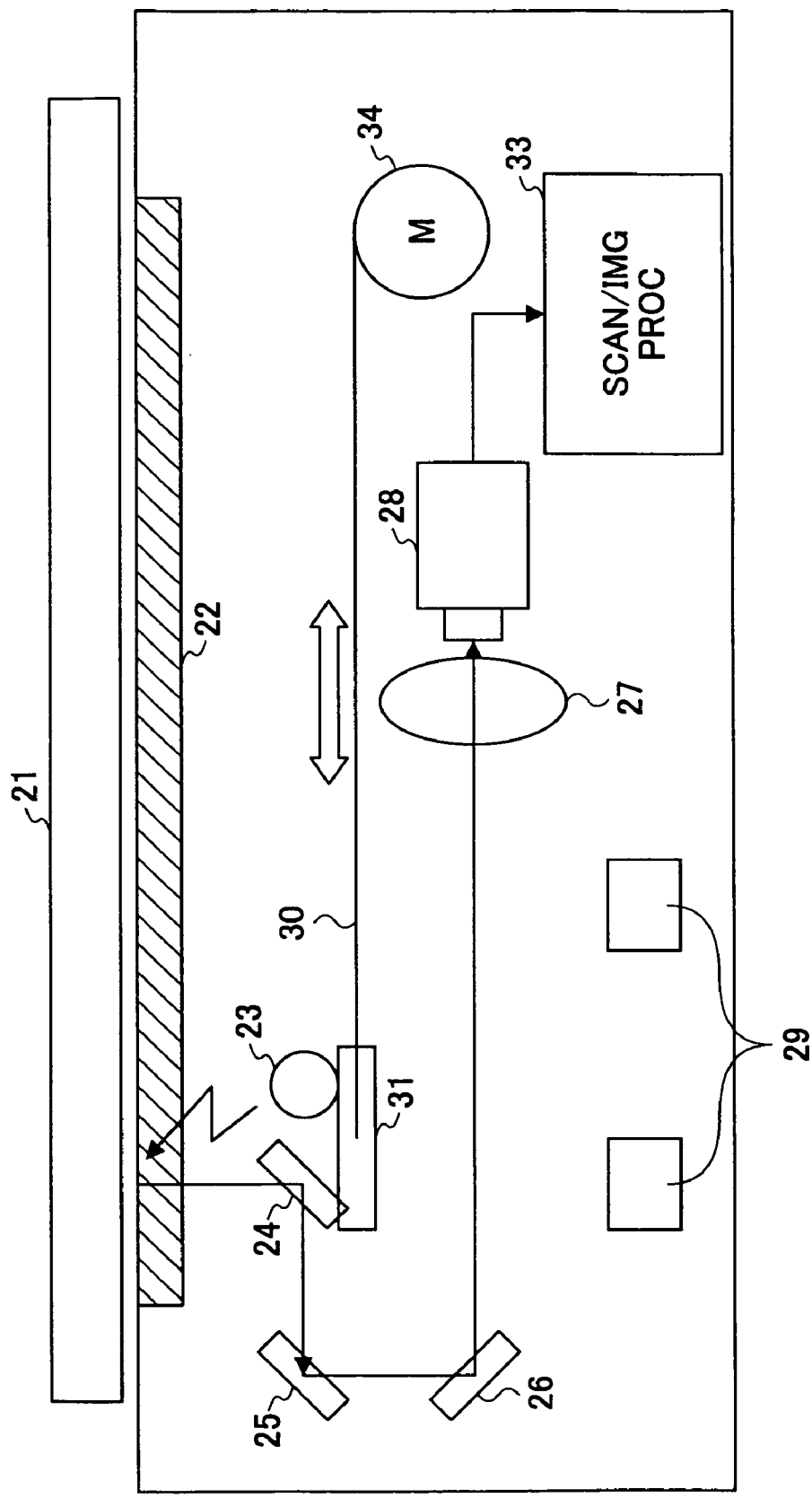
FIG. 52 is a diagram showing the construction of an image reading apparatus according to a sixth embodiment of the present invention.

FIG. 52 shows the construction of a scanner unit forming a part of the image forming apparatus of the present embodiment, particularly the interior of the image reading unit 4 of FIG. 1.

Referring to FIG. 52, there is provided a pressure plate 21 for holding a manuscript placed on a contact glass 22, wherein the pressure plate 21 is used to protect the contact glass 22 when there s no manuscript placed on the contact glass 22.

Further, there is provided an exposure lamp 23, wherein the exposure lamp 23 produces a light such that the light is reflected by the manuscript placed on the contact glass 22 and is directed to a CCD 28 after being reflected consecutively by three mirrors 24, 25 and 26 and focused by a lens 27.

In the CCD 28, the light thus reflected from the manuscript is converted to an analog electric signal and is forwarded to a scanner image processing part 33.

Further, there is provided a movable member 31 carrying the exposure lamp 23 and the mirror 24, wherein the movable member 31 is driven in the direction of arrows with rotation of a motor 34 via a wire 30, and sub-scanning of the manuscript is achieved thereby. Further, there is provided a manuscript size sensor and a circuit for detecting the size of the manuscript placed on the contact glass 22.

Hereinafter, operation of the embodiment will be explained wherein it should be noted that the present embodiment transmits print data for each page and request printing of the print data. Thereby, it should be noted that single-side print data of n pages is printed by m image forming units.

[Operation 1]

Figure 53:
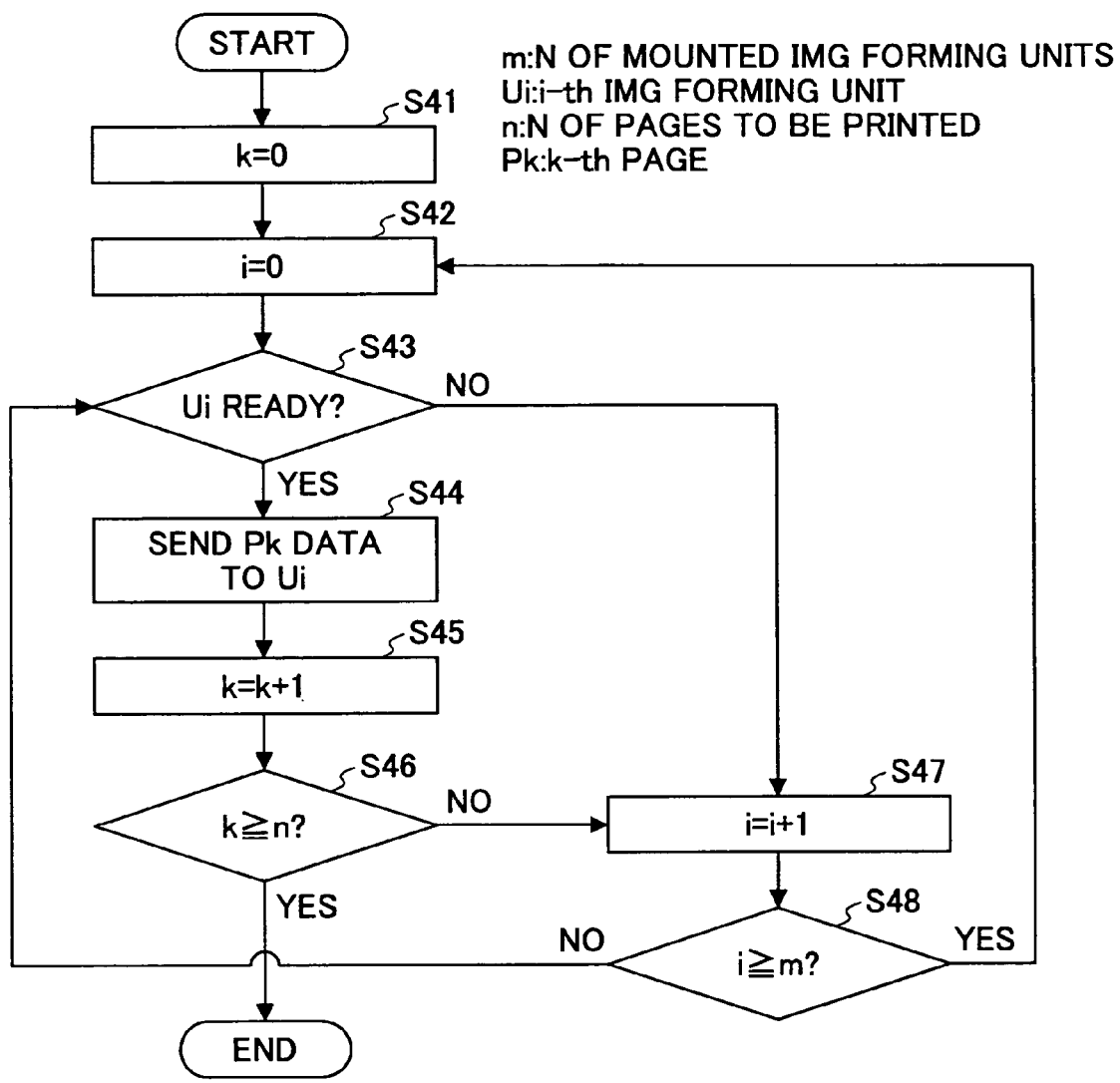
FIG. 53 is a flowchart showing the operation according to Operation 1 of a sixth embodiment of the present invention.

FIG. 53 shows the flowchart of operation of the system controller 1101 according to Operation 1.

Starting with the state in which no printing has been made yet, a step S41 is conducted in which a parameter k is set to zero and a step S42 is conducted in which a parameter i is set also to zero.

In this state, in order to acquire the state of an i-th image forming unit Ui, the system controller 1101 performs checking to the image forming controller of the image forming unit Ui in a step S43. Here, it should be noted that the "state" means whether or not the image forming apparatus can carry out printing.

Thus, when any one of the image writing unit 5, photosensitive drum 6, fixing unit 7, and the like, constituting the image forming unit is not in order, the image forming unit is not ready for printing.

Figure 56:
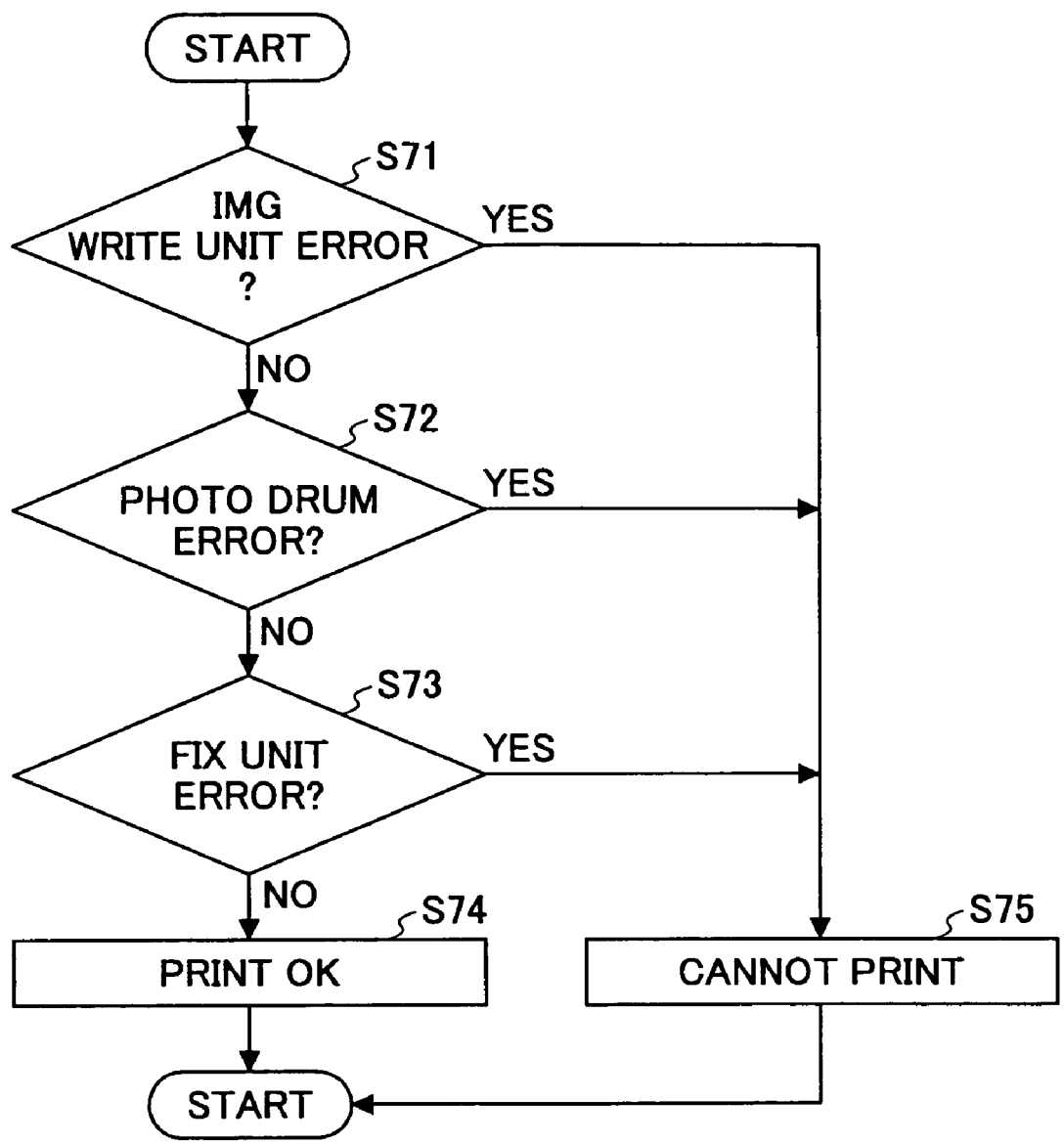
FIG. 56 is a flowchart showing the operation according to the sixth embodiment of the present invention.

FIG. 56 shows an example of the state checking flow chart of the image forming unit conducted in the step S43.

Referring to FIG. 56, examination is made at first as to whether or not the image writing unit is error in a step S71. Next, examination is made as to whether or not the photosensitive drum is error in a step S72, and examination is made further as to whether or not the fixing unit is in error in a step S73.

When there is no error in the image writing unit (NO in step S71), no error in the photosensitive drum (NO in step S72) and no error in the fixing unit (NO in step S73), it is declared in a step S74 that the image forming unit is ready for printing, while when there is an error in any one of the image forming unit, photosensitive drum and fixing unit (YES in step S71 or YES in step S72 or YES in step S73), it is declared in the step S75 that the image forming unit is not ready for printing. It should be noted that this flowchart of FIG. 56 is applied also to Operation 2 and Operation 3 to be described later.

When the i-th image forming unit Ui is ready for printing (YES in step S43), the system controller 1104 transmits, in a step S44, the data urging printing of k-th page Pk to the image forming unit Ui.

When the printing request is executed for the k-th page, the parameter k is set to k+1 (k=k+1) in a step S45, wherein when the value k has exceeded the number of pages n to be printed (YES in step S46), the print request from the system controller 1101 to the image forming controller is finished.

When the value k has not exceeded the page n to be printed (NO in step S46), the parameter i is increased by one (i=i+1) in a step S47 and the next image forming unit is selected as the image forming unit to be checked.

When the value of the parameter i has exceeded the number m of the mounted image forming units (YES in a step S48), the value of the parameter i is reset to zero (i=0) and the first image forming unit is selected as the image forming unit to be checked.

When the value i has not exceeded the number m of the mounted image forming units (NO in step S48), checking is made to Ui in a step S43 as to whether or not the image forming unit Ui is ready for printing.

When the image forming unit Ui is ready for printing (YES in step S43), the process explained previously is applied.

Further, when the image forming unit Ui is not ready for printing (NO in step S43), the parameter i is increased by one (i=i+1) in a step S47, and the next image forming unit is selected as the image forming unit to be checked.

Further, the foregoing process is repeated similarly.

According to the present embodiment, it becomes possible to increase the efficiency of printing by allocating the print pages to the image forming units that are ready for printing. Further, with such a construction, when some of the image forming units is not ready for printing, it is still possible to continue printing when other image forming unit is ready for printing.

Because the present embodiment checks the state of various image forming units consecutively as long as there are pages to be printed, it is possible to use the image forming units that have become ready for printing after the print has been started.

Further, when some image forming unit has become unready for printing after the printing has been started, it is possible, while not illustrated, to continue printing by retransmitting the print data for that page to other image forming unit ready for printing. Thereby, it is possible to complete the printing job without losing a single page.

[Operation 2]

Figure 54:
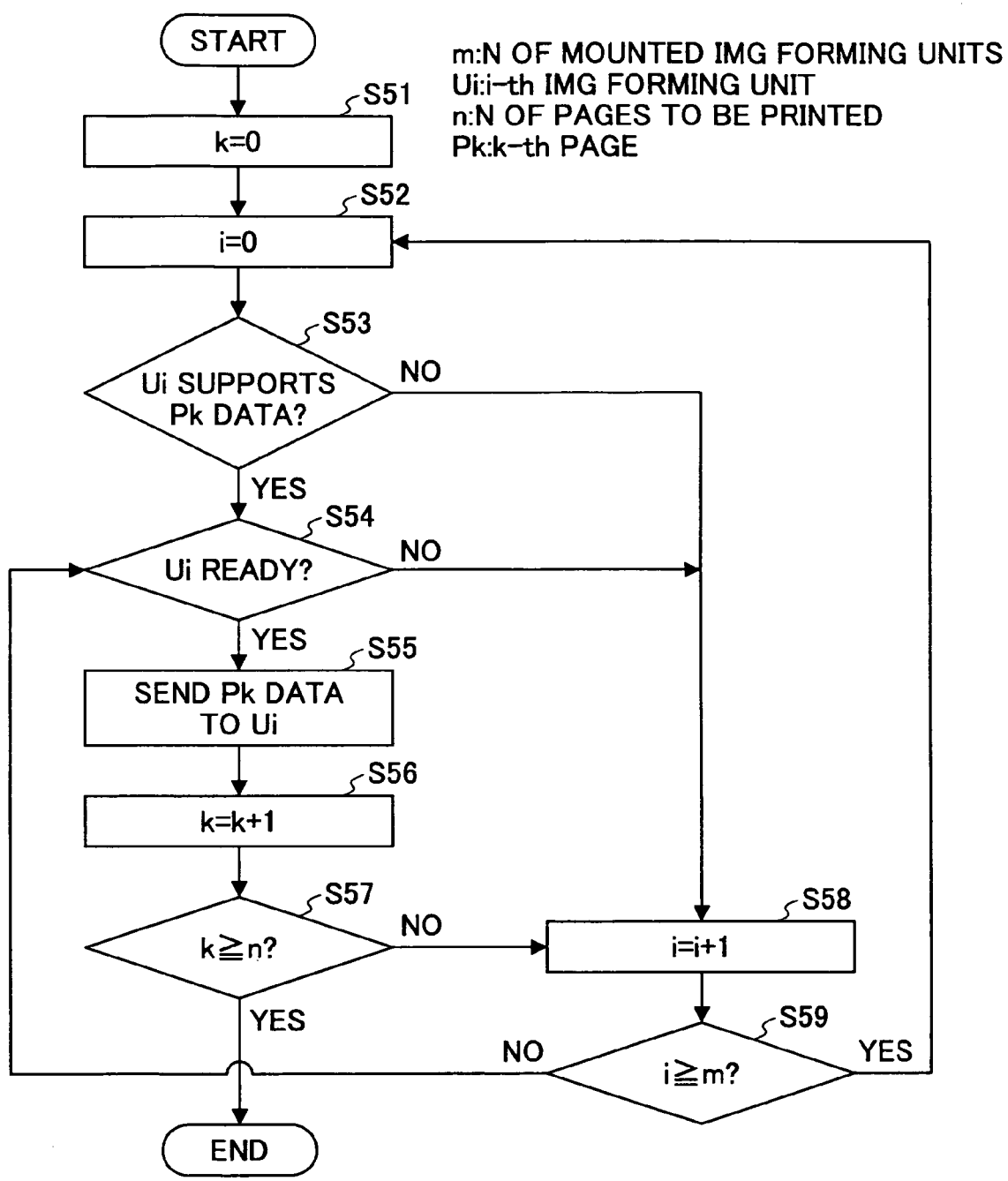
FIG. 54 is a flowchart showing the operation according to Operation 2 of the sixth embodiment of the present invention.

FIG. 54 is a flowchart of the operation of the system controller 1101 for Operation 2 of the present embodiment.

Starting with the state where no page has been printed yet, the parameter k is set to zero (k=0) in a step S51 and the parameter i is set to zero in a step S52.

The system controller 1101 has the information of the entire image forming units and selects, in a step S53, the i-th image forming unit Ui as the most suitable image forming unit for printing the print data Pk.

The decision of the system controller 1101 may be made by rejecting the image forming unit Ui for black and white recording when the Pk requests color printing.

In such a case, the parameter i is increased by one (i=i+1) in a step S58 and the next image forming unit is checked as to whether or not the next image forming unit chosen as Ui is a color image forming unit. However, there are various situations with regard to the selection of the image forming unit and the foregoing case is only one example.

When it was confirmed that the i-th image forming unit Ui is suitable for printing the print data of Pk (YES in step S53), discrimination is made as to whether or not this i-th image forming unit Ui is ready for printing (step S54).

When the i-th image forming unit Ui is ready for printing (YES in step S54), the print data is transmitted to the image forming unit Ui for printing of the k-th page Pk in a step S55.

After sending the print request for the k-th page, the parameter k is increased by one (k=k+1) in a step S56.

When the parameter k has exceeded the number of pages n to be printed (YES in step S57), the print request form the system controller 1101 to the image forming controller is terminated.

In the case the i-th image forming unit Ui is not ready for printing the printing data of Pk (NO in step S53), or in the case the i-th image forming unit Ui is not ready for printing (NO in step S54), or in the case the parameter k has not exceeded the page number n to be printed (NO in step S57), the parameter i is increased by one (i=i+1) and the next image forming unit is selected as the image forming unit to be checked.

When the value of the parameter i has exceeded the number m of the mounted image forming units (YES in a step S59), the value of the parameter i is reset to zero (i=0) in the step S52 and the first image forming unit is selected as the image forming unit to be checked.

When the value i has not exceeded the number m of the mounted image forming units (NO in step S59), checking is made to Ui in a step S54 as to whether or not the image forming unit Ui is ready for printing.

When the image forming unit Ui is ready for printing (YES in step S54), the process explained previously is applied.

Further, when the image forming unit Ui is not ready for printing (NO in step S54), the parameter i is increased by one (i=i+1) in the step S58, and the next image forming unit is selected as the image forming unit to be checked.

Further, the foregoing process is repeated similarly.

Thus, by concentrating the information regarding to the entire image forming unit to the system controller, it becomes possible for the system controller to achieve unified management for allocating the jobs to most suited image forming units.

[Operation 3]

Figure 55:
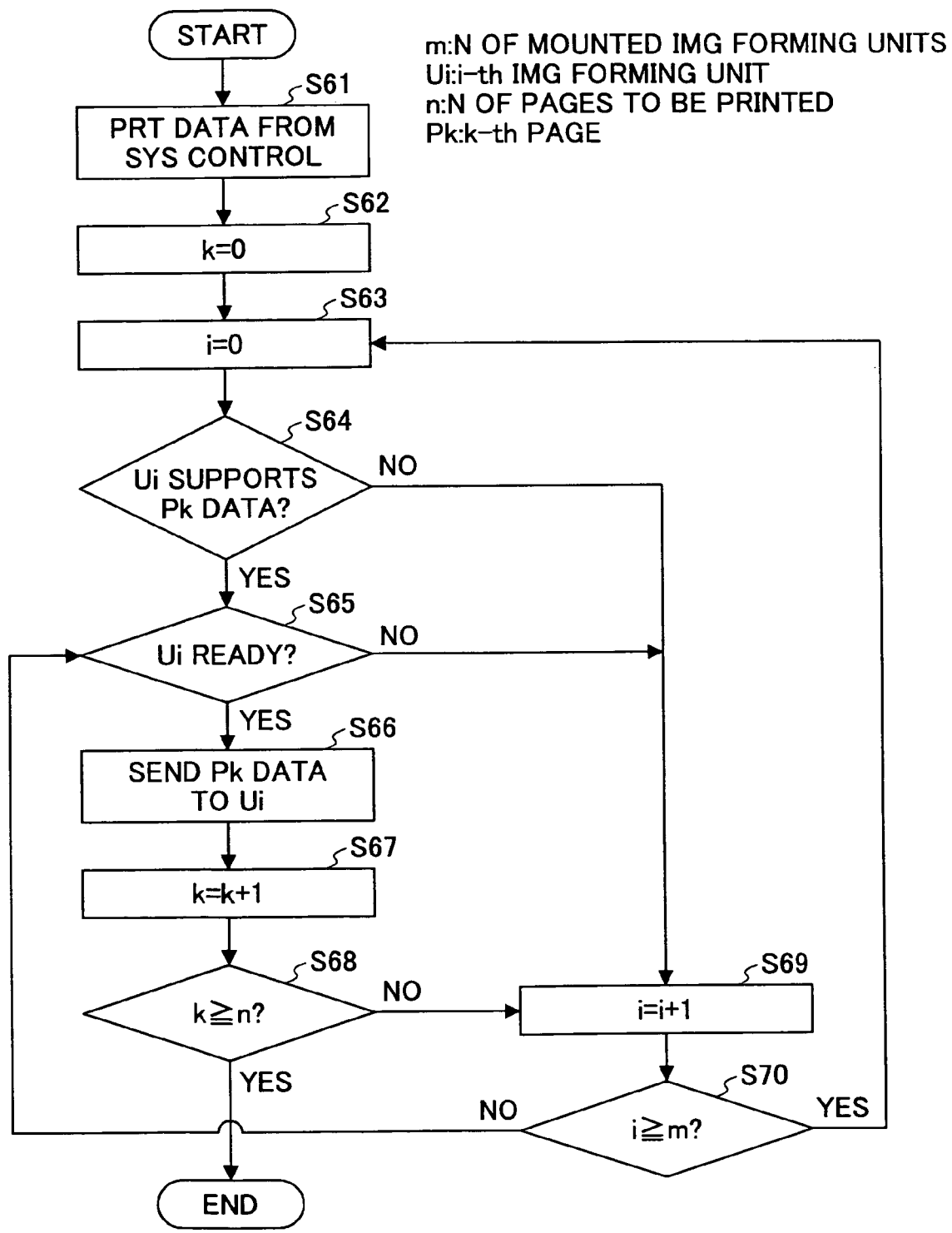
FIG. 55 is a flowchart showing the operation according to Operation 3 of the sixth embodiment of the present invention.

FIG. 55 is a flowchart showing the operation of the intermediate node 1209 of FIG. 4 as Operation 3 of the present embodiment.

Referring to FIG. 55, the intermediate node 1209 receives the print data from a system controller 1201 in a step S61, wherein the parameter k is set to zero (k=0) in a step S62 and the parameter I is set to zero (i=0) in view of the situation that there has been made no printing yet.

Here, the intermediate node has the information of the entire image forming units and judges, in a step S64, whether or not the i-th image forming unit Ui is the most suitable image forming unit for printing the print data Pk.

When it was confirmed that the i-th image forming unit Ui is suitable for printing the print data of Pk (YES in step S64), discrimination is made as to whether or not this i-th image forming unit Ui is ready for printing (step S65).

When the i-th image forming unit Ui is ready for printing (YES in step S65), the print data is transmitted to the image forming unit Ui for printing of the k-th page Pk in a step S66.

After sending the print request for the k-th page, the parameter k is increased by one (k=k+1) in a step S56.

When the parameter k has exceeded the number of pages n to be printed (YES in step S68), the print request form the system controller 1201 to the image forming controller 1204 is terminated.

In the case the i-th image forming unit Ui is not ready for printing the printing data of Pk (NO in step S64), or in the case the i-th image forming unit Ui is not ready for printing (NO in step S65), or in the case the parameter k has not exceeded the page number n to be printed (NO in step S68), the parameter i is increased by one (i=i+1) in a step S69 and the next image forming unit is selected as the image forming unit to be checked.

When the value of the parameter i has exceeded the number m of the mounted image forming units (YES in a step S70), the value of the parameter i is reset to zero (i=0) in the step S63 and the first image forming unit is selected as the image forming unit to be checked.

When the value i has not exceeded the number m of the mounted image forming units (NO in step S70), checking is made to Ui in a step S65 as to whether or not the image forming unit Ui is ready for printing.

When the image forming unit Ui is ready for printing (YES in step S65), the process explained previously is applied.

Further, when the image forming unit Ui is not ready for printing (NO in step S65), the parameter i is increased by one (i=i+1) in a step S69, and the next image forming unit is selected as the image forming unit to be checked.

Further, the foregoing process is repeated similarly.

Thus, by concentrating the information regarding to the entire image forming unit to the intermediate node provided between the system controller and the image forming controllers, it becomes possible for the system controller to carry out the same control to the intermediate node irrespective of increase or decrease of the number of the image forming units.

[Operation 4]

Next, Operation 4 of the present embodiment will be explained, wherein the flowchart of Operation 4 is identical to the flowchart of Operation 3 explained with reference to FIG. 55. In Operation 4, however, the information about the image forming units are concentrated to the memory controller 1206 and the intermediate node 1209 decides whether or not the i-th image forming unit Ui is suitable for printing the printing data of Pk (step S64) by referring to the memory controller 1206 when necessary. Otherwise, Operation 4 is identical to Operation 3.

With the construction of FIG. 4, in which the information of the entire image forming units are held not in the intermediate node but in the memory controller, the intermediate node no longer needs a memory unit and the cost of the system can be reduced. In Operation 4, too, the system controller can carry out the same control operation to the intermediate part irrespective of increase or decrease of the image forming units.

Thus, according to Operation 1 of the present embodiment, it becomes possible to allocate the print jobs to different image forming units by providing plural image forming units. As a result, the speed of printing is increased significantly. Further, it is possible to carry out the printing even when some of the image forming units is not ready for printing.

According to Operation 2 of the present embodiment, it becomes possible to achieve a unified management in allocating the print jobs to different image forming units, by concentrating the information with regard to the image forming units to the system controller. Thereby, further increase of the printing speed is attained.

According to Operation 3 of the present embodiment, in which the information regarding the image forming units are concentrated to the intermediate node provided between the system controller and the image forming controllers, it becomes possible for the system controller to carry out the same control operation irrespective of the number of the image forming units.

Further, according to Operation 4 of the present embodiment, in which the information of the image forming units are concentrated to the memory part, the system controller can carry out the same control operation irrespective of the number of the image forming units. Further, the intermediate node provided between the system controller and the image controllers does not need a memory unit, and the cost of the image forming apparatus can be reduced.

Further, the present invention is by no means limited to the embodiments described heretofore, but various variations and modifications may be made without departing from the scope of the invention.

The present invention is based on Japanese priority application No. 2004-374671 filed on Dec. 24, 2004, which is incorporated herein as reference.

What is claimed is:

1. An image forming apparatus, comprising:
a print-request information inputting unit configured to be inputted with print-request information that specifies a predetermined print processing, said print-request information inputting unit further configured to execute said predetermined print processing;
an image reading unit configured to read an image of a manuscript;
a plurality of image forming units each configured to form image data of an image read by said image reading unit as an output thereof;
a plurality of sheet feeding units each configured to hold recording sheets to be recorded with said image data formed by said image forming unit, each of said plurality of sheet feeding units configured to feed said recording sheet to said image forming apparatus;
a memory unit configured to memorize ID information, said ID information identifying a specific image forming unit or a specific sheet feeding unit, said memory unit further configured to memorize device information corresponding to said ID information; and
a control unit configured to control said print-request information inputting unit, said image reading unit, said plurality of image forming units, said plurality of sheet feeding units and said memory unit, said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing,
wherein said control unit decides whether or not it is necessary to carry out color adjustment during execution of said print processing and carries out said color adjustment based on said color adjustment record information of said image forming unit.

2. An image forming apparatus, comprising:
a print-request information inputting unit configured to be inputted with print-request information that specifies a predetermined print processing, said print-request information inputting unit further configured to execute said predetermined print processing;
an image reading unit configured to read an image of a manuscript;
a plurality of image forming units each configured to form image data of an image read by said image reading unit as an output thereof;
a plurality of sheet feeding units each configured to hold recording sheets to be recorded with said image data formed by said image forming unit, each of said plurality of sheet feeding units configured to feed said recording sheet to said image forming apparatus;
a memory unit configured to memorize ID information, said ID information identifying a specific image forming unit or a specific sheet feeding unit, said memory unit further configured to memorize device information corresponding to said ID information; and
a control unit configured to control said print-recluest information inputting unit, said image reading unit, said plurality of image forming units, said plurality of sheet feeding units and said memory unit, said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing,
wherein said control unit determines, when carrying out said print processing, whether or not each of said plural image forming units is loaded with a toner generally equivalent to the toner of other image forming units by referring to said toner information, said control unit further selects all of said image forming units when said plural image forming units are loaded with the toners that are generally equivalent with each other.

3. An image forming apparatus, comprising:
a print-request information inputting unit configured to be inputted with print-request information that specifies a predetermined print processing, said print-request information inputting unit further configured to execute said predetermined print processing;
an image reading unit configured to read an image of a manuscript;
a plurality of image forming units each configured to form image data of an image read by said image reading unit as an output thereof;
a plurality of sheet feeding units each configured to hold recording sheets to be recorded with said image data formed by said image forming unit, each of said plurality of sheet feeding units configured to feed said recording sheet to said image forming apparatus;
a memory unit configured to memorize ID information, said ID information identifying a specific image forming unit or a specific sheet feeding unit, said memory unit further configured to memorize device information corresponding to said ID information; and a control unit configured to control said print-request information inputting unit, said image reading unit, said plurality of image forming units, said plurality of sheet feeding units and said memory unit;

said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing, wherein said control unit asks for a decision of a user of said image forming apparatus, when said plural image forming units are not loaded with the toners that are generally identical with each other, as to whether image quality is given priority or printing speed is given priority, said control unit further selecting all of said image forming units when said user has put priority on said printing speed, said control unit, on the other hand, selecting only those image forming units that provide generally the same image quality when said user has put priority on image quality.

4. An image forming apparatus, comprising:

a print-request information inputting unit configured to be inputted with print-request information that specifies a predetermined print processing, said print-request information inputting unit further configured to execute said predetermined print processing;

an image reading unit configured to read an image of a manuscript;

a plurality of image forming units each configured to form image data of an image read by said image reading unit as an output thereof;

a plurality of sheet feeding units each configured to hold recording sheets to be recorded with said image data formed by said image forming unit, each of said plurality of sheet feeding units configured to feed said recording sheet to said image forming apparatus;

a memory unit configured to memorize ID information, said ID information identifying a specific image forming unit or a specific sheet feeding unit, said memory unit further configured to memorize device information corresponding to said ID information; and a control unit configured to control said print-request information inputting unit, said image reading unit, said plurality of image forming units, said plurality of sheet feeding units and said memory unit;

said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing, wherein said control unit detects whether or not there exists a sheet feeding unit not updated or not registered, said control unit memorizing, when existence of an un-updated or unregistered sheet feeding unit has been discovered, recording sheet information of said newly discovered sheet feeding unit in said memory unit, and said control unit selects said optimum image forming unit based on said image formation time information when there are plural image forming units.

5. The image forming apparatus as claimed in claim 4, wherein said image formation time information is created based upon said recording sheet feed speed information, said path-length information and said recording sheet information.

6. An image forming apparatus, comprising:

a print-request information inputting unit configured to be inputted with print-request information that specifies a predetermined print processing, said print-request information inputting unit further configured to execute said predetermined print processing;

an image reading unit configured to read an image of a manuscript;

a plurality of image forming units each configured to form image data of an image read by said image reading unit as an output thereof;

a plurality of sheet feeding units each configured to hold recording sheets to be recorded with said image data formed by said image forming unit, each of said plurality of sheet feeding units configured to feed said recording sheet to said image forming apparatus;

a memory unit configured to memorize ID information, said ID information identifying a specific image forming unit or a specific sheet feeding unit, said memory unit further configured to memorize device information corresponding to said ID information; and a control unit configured to control said print-request information inputting unit, said image reading unit, said plurality of image forming units, said plurality of sheet feeding units and said memory unit, said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing, wherein said device information at least comprises:

printability information indicative of whether or not said image forming apparatus is in a state capable of executing said print processing;

color support information indicative of colors supported by said image forming unit;

color adjustment record information indicative of whether or not it is necessary to carry out color adjustment for said image forming apparatus;

toner information indicative of toners equipped with said image forming unit;

recording sheet information indicative of the type of recording sheet supported with said image forming unit;

support information of said image forming unit with regard to said sheet feeding unit;

image formation time information indicative of a time needed for image formation in said image forming unit;

recording sheet size information indicative of a size of recording sheet supported by said image forming unit and further by said sheet feeding unit;

loading state information indicative of a loading state of each of said image forming unit and said sheet feeding unit;

path-length information indicative of a length of a predetermined part in said image forming unit; duplex printability information indicative of whether or not said image forming unit is capable of carrying out duplex printing;

image formation speed information indicative of a speed for carrying out image formation in said image forming unit; and sheet feed speed information indicative of a feed speed of a recording sheet in said image forming apparatus, and wherein said control unit creates said recording sheet size information and said path-length information corresponding to a combination of said image forming unit and said sheet feeding unit based on said loading state information of said image forming unit, said recording size information of said image forming unit, said loading state information of said sheet feeding unit and said recording sheet size information of said sheet feeding unit, said control unit memorizing said created recording sheet information and path-length information in said memory unit.

7. An image forming apparatus, comprising;

a print-request information inputting unit configured to be inputted with print-request information that specifies a predetermined print processing, said print-request information inputting unit further configured to execute said predetermined print processing;

an image reading unit configured to read an image of a manuscript;

a plurality of image forming units each configured to form image data of an image read by said image reading unit as an output thereof;

a plurality of sheet feeding units each configured to hold recording sheets to be recorded with said image data formed by said image forming unit, each of said plurality of sheet feeding units configured to feed said recording sheet to said image forming apparatus;

a memory unit configured to memorize ID information, said ID information identifying a specific image forming unit or a specific sheet feeding unit, said memory unit further configured to memorize device information corresponding to said ID information; and a control unit configured to control said print-request information inputting unit, said image reading unit, said plurality of image forming units, said plurality of sheet feeding units and said memory unit, said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing, wherein said device information at least comprises:

printability information indicative of whether or not said image forming apparatus is in a state capable of executing said print processing;

color support information indicative of colors supported by said image forming unit;

color adjustment record information indicative of whether or not it is necessary to carry out color adjustment for said image forming apparatus;

toner information indicative of toners equipped with said image forming unit;

recording sheet information indicative of the type of recording sheet supported with said image forming unit;

support information of said image forming unit with regard to said sheet feeding unit;

image formation time information indicative of a time needed for image formation in said image forming unit;

recording sheet size information indicative of a size of recording sheet supported by said image forming unit and further by said sheet feeding unit;

loading state information indicative of a loading state of each of said image forming unit and said sheet feeding unit;

path-length information indicative of a length of a predetermined part in said image forming unit;

duplex printability information indicative of whether or not said image forming unit is capable of carrying out duplex printing;

image formation speed information indicative of a speed for carrying out image formation in said image forming unit; and sheet feed speed information indicative of a feed speed of a recording sheet in said image forming apparatus, and wherein said control unit creates said image formation time information corresponding to a combination of said image forming unit and said sheet feeding unit based on said loading state information of said image forming unit, said recording sheet size information of said image forming unit, said image formation time information of said image forming unit, said loading state information of said sheet feeding unit and said recording sheet size information of said sheet feeding unit, said control unit memorizing said created image formation time information in said memory unit.

8. An image forming apparatus, comprising;

a print-request information inputting unit configured to be inputted with print-request information that specifies a predetermined print processing, said print-request information inputting unit further configured to execute said predetermined print processing;

an image reading unit configured to read an image of a manuscript;

a plurality of image forming units each configured to form image data of an image read by said image reading unit as an output thereof;

a plurality of sheet feeding units each configured to hold recording sheets to be recorded with said image data formed by said image forming unit, each of said plurality of sheet feeding units configured to feed said recording sheet to said image forming apparatus;

a memory unit configured to memorize ID information, said ID information identifying a specific image forming unit or a specific sheet feeding unit, said memory unit further configured to memorize device information corresponding to said ID information; and a control unit configured to control said print-request information inputting unit, said image reading unit, said plurality of image forming units, said plurality of sheet feeding units and said memory unit, said control unit configured to read out, when said print-request information is inputted, said ID information and said device information from said memory unit, said control unit further configured to select, based on plural ID information, said device information and said print-request information, an optimum image forming unit that satisfies said print-request information, said control unit further configured to cause said selected image forming unit to execute said print processing, wherein said device information at least comprises:
printability information indicative of whether or not said image forming apparatus is in a state capable of executing said print processing;
color support information indicative of colors supported by said image forming unit;
color adjustment record information indicative of whether or not it is necessary to carry out color adjustment for said image forming apparatus;
toner information indicative of toners equipped with said image forming unit; recording sheet information indicative of the type of recording sheet supported with said image forming unit;
support information of said image forming unit with regard to said sheet feeding unit;
image formation time information indicative of a time needed for image formation in said image forming unit;
recording sheet size information indicative of a size of recording sheet supported by said image forming unit and further by said sheet feeding unit;
loading state information indicative of a loading state of each of said image forming unit and said sheet feeding unit;
path-length information indicative of a length of a predetermined part in said image forming unit;
duplex printability information indicative of whether or not said image forming unit is capable of carrying out duplex printing;
image formation speed information indicative of a speed for carrying out image formation in said image forming unit; and
sheet feed speed information indicative of a feed speed of a recording sheet in said image forming apparatus,
wherein said path-length information comprises the information that represents a path length in which any two of: an entrance of said image forming unit; an outlet of said image forming unit; a connection part of said image forming units; and said sheet feeding unit, are combined, said path-length information being memorized in said memory unit for each of said combinations.

9. An image forming method for forming an image by using an image forming apparatus, said image forming apparatus including; a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:
selecting, when print-request information identifying and carrying out a specific print processing has been given, an optimum image forming unit that satisfies said print-request information from said plurality of image forming units based on plural ID information, said device information and said print-request information;
causing said selected image forming unit to execute said print processing; and
deciding whether or not it is necessary to carry out color adjustment during execution of said print processing and carrying out said color adjustment based on said color adjustment record information of said image forming unit.

10. An image forming method for forming an image by using an image forming apparatus, said image forming apparatus including: a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:
selecting, when print-request information identifying and carrying out a specific print processing has been given, an optimum image forming unit that satisfies said print-request information from said plurality of image forming units based on plural ID information, said device information and said print-request information;
causing said selected image forming unit to execute said print processing; and
determining, when carrying out said print processing, whether or not each of said plural image forming units is loaded with a toner generally equivalent to the toner of other image forming units by referring to said toner information; and selecting all of said image forming units when said plural image forming units are loaded with the toners that are generally equivalent with each other.

11. The image forming method as claimed in claim 10, wherein said method further includes the steps of:
asking for decision of a user of said image forming apparatus, when said plural image forming units are not loaded with the toners that are generally identical with each other, as to whether image quality is given priority or printing speed is given priority; and
selecting all of said image forming units when said user has put priority on said printing speed; or selecting only those image forming units that provide generally the same image quality when said user has put priority on image quality.

12. An image forming method for forming an image by using an image forming apparatus, said image forming apparatus including; a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:
selecting, when print-request information identifying and carrying out a specific print processing has been given, an optimum image forming unit that satisfies said print-request information from said plurality of image forming units based on plural ID information, said device information and said print-request information;
causing said selected image forming unit to execute said print processing;
detecting whether or not there exists a sheet feeding unit not updated or not registered;
memorizing, when existence of an un-updated or unregistered sheet feeding unit has been discovered, recording sheet information of said newly discovered sheet feeding unit in said memory unit; and selecting said optimum image forming unit based on said image formation time information when there are plural image forming units.

13. The image forming method as claimed in claim 12, wherein said image formation time information is created based upon said recording sheet feed speed information, said path-length information and said recording sheet information.

14. An image forming method for forming an image by using an image forming apparatus, said image forming apparatus including: a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:

selecting, when print-request information identifying and carrying out a specific print processing has been given, an optimum image forming unit that satisfies said print-request information from said plurality of image forming units based on plural ID information, said device information and said print-request information;

causing said selected image forming unit to execute said print processing;

creating said recording sheet size information and said path-length information corresponding to a combination of said image forming unit and said sheet feeding unit based on said loading state information of said image forming unit, said recording size information of said image forming unit, said loading state information of said sheet feeding unit and said recording sheet size information of said sheet feeding unit; and memorizing said created recording sheet information and path-length information in said memory unit.

15. An image forming method for forming an image by using an image forming apparatus, said image forming apparatus including a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:

selecting, when print-recluest information identifying and carrying out a specific print processing has been given, an optimum image forming unit that satisfies said print-request information from said plurality of image forming units based on plural ID information, said device information and said print-request information;

causing said selected image forming unit to execute said print processing;

creating said image formation time information corresponding to a combination of said image forming unit and said sheet feeding unit based on said loading state information of said image forming unit, said recording sheet size information of said image forming unit, said image formation time information of said image forming unit, said loading state information of said sheet feeding unit and said recording sheet size information of said sheet feeding unit; and memorizing said created image formation time information in said memory unit.

16. An image forming method for forming an image by using an image forming apparatus, said image forming apparatus including: a plurality of image forming units, each of said plurality of image forming units configured to provide image data of a read image as an output; a plurality of sheet feeding units each configured to hold sheets to be recorded with said image data, each of said plurality of sheet feeding units further providing said recording sheet to said image forming unit; and a memory unit configured to memorize ID information identifying a specific image forming unit or specific sheet feeding unit, said memory unit further configured to memorize device information corresponding to said ID information, said method comprising the steps of:

selecting, when print-request information identifying and carrying out a specific print processing has been given, an optimum image forming unit that satisfies said print-request information from said plurality of image forming units based on plural ID information, said device information and said print-recluest information; and causing said selected image forming unit to execute said print processing, wherein said device information at least comprises:

printability information indicative of whether or not said image forming apparatus is in a state capable of executing said print processing;

color support information indicative of colors supported by said image forming unit;

color adjustment record information indicative of whether or not it is necessary to carry out color adjustment for said image forming apparatus;

toner information indicative of toners equipped with said image forming unit;

recording sheet information indicative of the type of recording sheet supported with said image forming unit;

support information of said image forming unit with regard to said sheet feeding unit;

image formation time information indicative of a time needed for image formation in said image forming unit;

recording sheet size information indicative of a size of recording sheet supported by said image forming unit and further by said sheet feeding unit;

loading state information indicative of a loading state of each of said image forming unit and said sheet feeding unit;

path-length information indicative of a length of a predetermined part in said image forming unit, said path-length information includes the information that represents a path length in which any two of; an entrance of said image forming unit; an outlet of said image forming unit; a connection part of said image forming units; and said sheet feeding unit, are combined, said path-length information being memorized in said memory unit for each of said combinations;

duplex printability information indicative of whether or not said image forming unit is capable of carrying out duplex printing;

image formation speed information indicative of a speed for carrying out image formation in said image forming unit; and sheet feed speed information indicative of a feed speed of a recording sheet in said image forming apparatus.

* * * * *